(12) United States Patent
Southward et al.

(10) Patent No.: US 8,778,831 B2
(45) Date of Patent: Jul. 15, 2014

(54) BASE METAL AND BASE METAL MODIFIED DIESEL OXIDATION CATALYSTS

(75) Inventors: Barry W. L. Southward, Frankfurt am main (DE); Curt Ellis, Broken Arrow, OK (US)

(73) Assignee: Umicore AG & Co. KG, Hanau-Wolfgang (DE)

(*) Notice: Subject to any disclaimer, the term of this patent is extended or adjusted under 35 U.S.C. 154(b) by 576 days.

(21) Appl. No.: 12/408,411

(22) Filed: Mar. 20, 2009

(65) Prior Publication Data
US 2009/0257935 A1 Oct. 15, 2009

Related U.S. Application Data

(63) Continuation-in-part of application No. 12/240,170, filed on Sep. 29, 2008, now abandoned, which is a continuation-in-part of application No. 12/363,310, filed on Jan. 30, 2009, which is a continuation-in-part of application No. 12/363,329, filed on Jan. 30, 2009.

(60) Provisional application No. 61/039,879, filed on Mar. 27, 2008.

(51) Int. Cl.
*B01J 23/10* (2006.01)

(52) U.S. Cl.
USPC ........... 502/304; 502/349; 502/302; 502/300; 423/239.1

(58) Field of Classification Search
USPC ............. 502/73–74, 305–323, 304, 349, 302, 502/300; 423/239.1
See application file for complete search history.

(56) References Cited

U.S. PATENT DOCUMENTS

| | | |
|---|---|---|
| 3,894,965 A | 7/1975 | Foster et al. |
| 4,738,947 A | 4/1988 | Wan et al. |
| 4,902,487 A | 2/1990 | Cooper et al. |
| 5,064,803 A | 11/1991 | Nunan |
| 5,371,056 A | 12/1994 | Leyrer et al. |
| 5,462,907 A | 10/1995 | Farrauto et al. |
| 6,133,194 A | 10/2000 | Cuif et al. |

(Continued)

FOREIGN PATENT DOCUMENTS

| | | |
|---|---|---|
| EP | 1 504 815 A1 | 2/2005 |
| EP | 1 994 982 A1 | 11/2008 |

(Continued)

OTHER PUBLICATIONS

Maya G., Catalysis by Transition Metal Modified Ceria and Ceria-Zirconia Mixed Oxides Prepared via Sol-Gel Route, 2006, Cochin University of Science and Technology, 1-170.*

(Continued)

*Primary Examiner* — Kaj K Olsen
*Assistant Examiner* — Pritesh Darji
(74) *Attorney, Agent, or Firm* — Smith, Gambrell & Russell, LLP

(57) ABSTRACT

There is described a base metal modified Cerium containing oxide materials and their application as catalysts for the oxidation of CO and HC emissions from a compression ignition/diesel engine. These materials provide effective promotion of CO and HC oxidation function in the presence or absence of PGM and are based upon OIC/OS materials having a stable cubic crystal structure, and most especially to promoted OIC/OS materials wherein the promotion is achieved by the post-synthetic introduction of non-precious metals via a basic (alkaline) exchange process.

23 Claims, 21 Drawing Sheets

(56) References Cited

U.S. PATENT DOCUMENTS

| | | | |
|---|---|---|---|
| 6,153,160 | A | 11/2000 | Voss et al. |
| 6,248,684 | B1 | 6/2001 | Yavuz et al. |
| 6,255,249 | B1 | 7/2001 | Voss et al. |
| 6,274,107 | B1 | 8/2001 | Yavuz et al. |
| 6,387,338 | B1 | 5/2002 | Anatoly et al. |
| 6,458,741 | B1 | 10/2002 | Roark et al. |
| 6,468,941 | B1 | 10/2002 | Bortun et al. |
| 6,548,446 | B1 | 4/2003 | Koermer et al. |
| 6,585,944 | B1 | 7/2003 | Nunan et al. |
| 6,605,264 | B2 | 8/2003 | Bortun et al. |
| 6,689,327 | B1 | 2/2004 | Reck |
| 6,750,168 | B2 | 6/2004 | Yan et al. |
| 7,078,004 | B2 | 7/2006 | Voss et al. |
| 7,313,913 | B2 | 1/2008 | Okugawa |
| 7,412,822 | B2 | 8/2008 | Zhan |
| 7,433,776 | B1 | 10/2008 | Hunter |
| 7,441,403 | B2 | 10/2008 | Sun |
| 7,469,532 | B2 | 12/2008 | Williamson |
| 7,943,104 | B2 | 5/2011 | Kozlov et al. |
| 2005/0282698 | A1 | 12/2005 | Southward et al. |
| 2006/0162317 | A1 | 7/2006 | Twigg et al. |
| 2006/0252638 | A1 | 11/2006 | Matsueda et al. |
| 2007/0104623 | A1 | 5/2007 | Dettling et al. |
| 2008/0202107 | A1 | 8/2008 | Boorse |
| 2009/0246109 | A1 | 10/2009 | Southward |
| 2009/0259735 | A1 | 10/2009 | Southward et al. |
| 2010/0077727 | A1 | 4/2010 | Southward et al. |
| 2010/0196217 | A1 | 8/2010 | Southward et al. |
| 2010/0197479 | A1 | 8/2010 | Southward et al. |

FOREIGN PATENT DOCUMENTS

| | | | |
|---|---|---|---|
| JP | 4114742 | A | 4/1992 |
| JP | 4334548 | A | 11/1992 |
| JP | 2006187675 | A | 7/2006 |
| JP | 2006326478 | A | 12/2006 |
| WO | 2005031132 | | 4/2005 |
| WO | 2006079850 | A1 | 8/2006 |
| WO | 2006090190 | A1 | 8/2006 |
| WO | 2007111004 | A1 | 10/2007 |

OTHER PUBLICATIONS

Notification Concerning Transmittal of International Preliminary Report on Patentability received in PCT/US2009/038398 mailed Oct. 7, 2010.

International Preliminary Report on Patentability received in PCT/US2009/038398 mailed Sep. 28, 2010.

Written Opinion of the International Searching Authority received in PCT/US2009/038398 mailed May 26, 2009.

International Search Report for PCT/US09/38398 mailed on May 26, 2009.

Morlang, A. et al. (2005) "Bimetallic Pt/Pd Diesel Oxidation Catalysts Structural Characterisation and Catalytic Behaviour" Applied Catalysts B: Environmental 60:191-199.

Twigg, M. (2006) "Progress and Future Challenges in Controlling Automotive Exhaust Gas Emissions" Applied Catalysts B: Environmental 70:2-15.

John P.A. Neeft et al., "Catalysts for the oxidation of soot from diesel exhaust gases. I. An exploratory study", Applied Catalysis B: Environmental 8, 1996, pp. 57-78.

John P.A. Neeft et al., "Catalysts for the oxidation of soot from diesel exhaust gases. II. Contact between soot and catalyst under practical conditions", Applied Catalysis B: Environmental 12, 1997, pp. 21-31.

Southward et al., "An Investigation into NO2-Decoupling of Catalyst to Soot Contact and Its Implications for Catalysed DPF Performance", SAE Int. J. Fuels Lubr., 2008-01-0481, date published Apr. 14, 2008, vol. 1, issue 1 pp. 239-251.

PCT International Search Report (Form PCT/ISA/210) issued in corresponding International Application No. PCT/EP2009/002261 mailed Aug. 20, 2009.

PCT Notification of Transmittal of Search Report and Written Opinion (Form PCT/ISA/220) for International Application No. PCT/EP2009/002261 mailed Aug. 20, 2009.

PCT Written Opinion (Form PCT/ISA/237) for International Application No. PCT/EP2009/002261 mailed Aug. 20, 2009.

Shu-Ping Wang et al., "Synthesis, characterization and catalytic activity of Au/Ce0.8Zrr0.2O2 catalysts for CO oxidation", Journal of Molecular Catalysis A: Chemical 272, 2007, pp. 45-52.

PCT International Search Report (Form PCT/ISA/210) issued Aug. 18, 2009 for International Application No. PCT/EP2009/002262.

PCT Notification of Transmittal of International Search Report and the Written Opinion (Form PCT/ISA/220) issued Aug. 18, 2009 for International Application No. PCT/EP2009/002262.

PCT Written Opinion (Form PCT/ISA/237) issued Aug. 18, 2009 for International Application No. PCT/EP2009/002262.

PCT International Preliminary Report on Patentability (Form PCT/IB/373) issued Sep. 28, 2010 for International Application No. PCT/EP2009/002263.

PCT Written Opinion of International Searching Authority (Form PCT/ISA/237) issued Sep. 27, 2010 for International Application No. PCT/EP2009/002263.

M. Pfeifer et al., "NewPlatinum/Palladium Based Catalyzed Filter Technologies for Future Passenger Car Applications", SAE Technical Paper Series, 2007-01-0234, 2007.

PCT International Search Report (Form PCT/ISA/210) issued Jan. 22, 2010 for International Application No. PCT/US09/038403.

PCT Written Opinion (Form PCT/ISA/237) dated Jan. 22, 2010 for International Application No. PCT/US09/038403.

PCT Notification Concerning Transmittal of Preliminary Report (Form PCT/IB/326) dated Oct. 7, 2010 for International Application No. PCT/US09/038403.

PCT International Preliminary Report (Form PCT/IB/373) issued Sep. 28, 2010 for International Application No. PCT/US09/038403.

* cited by examiner

Figure 1: TPR comparison of OS3 and 2wt%Cu-doped OS3
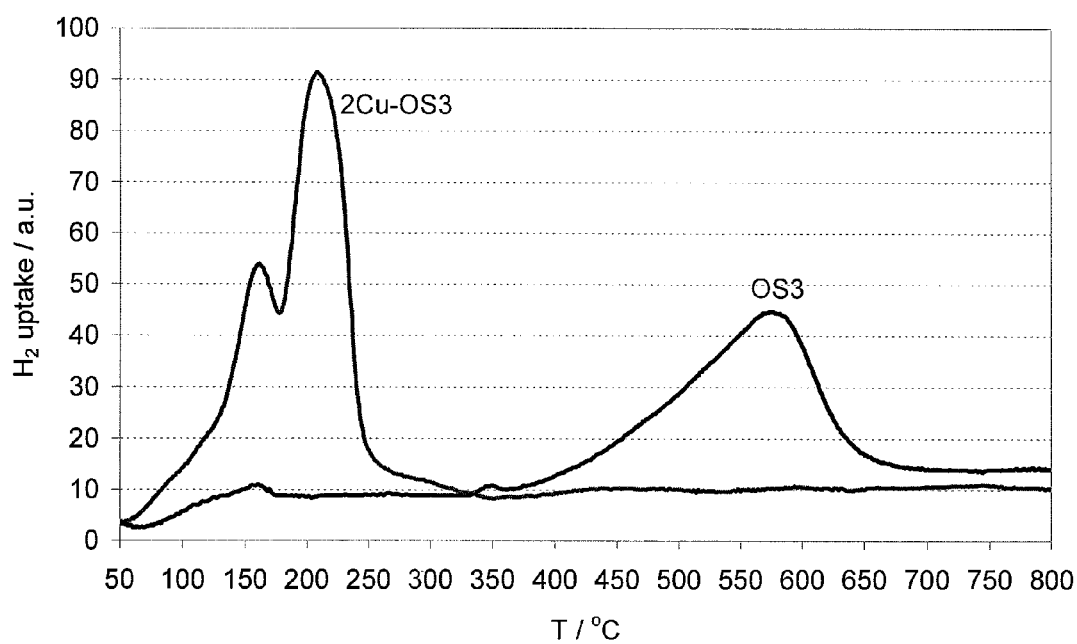

Figure 2: CO and HC Light-off on SGB for 5Ag-OS1 vs 5Cu-OS1 (0.5g Zeolite β inlet // 1.5 g OS outlet).
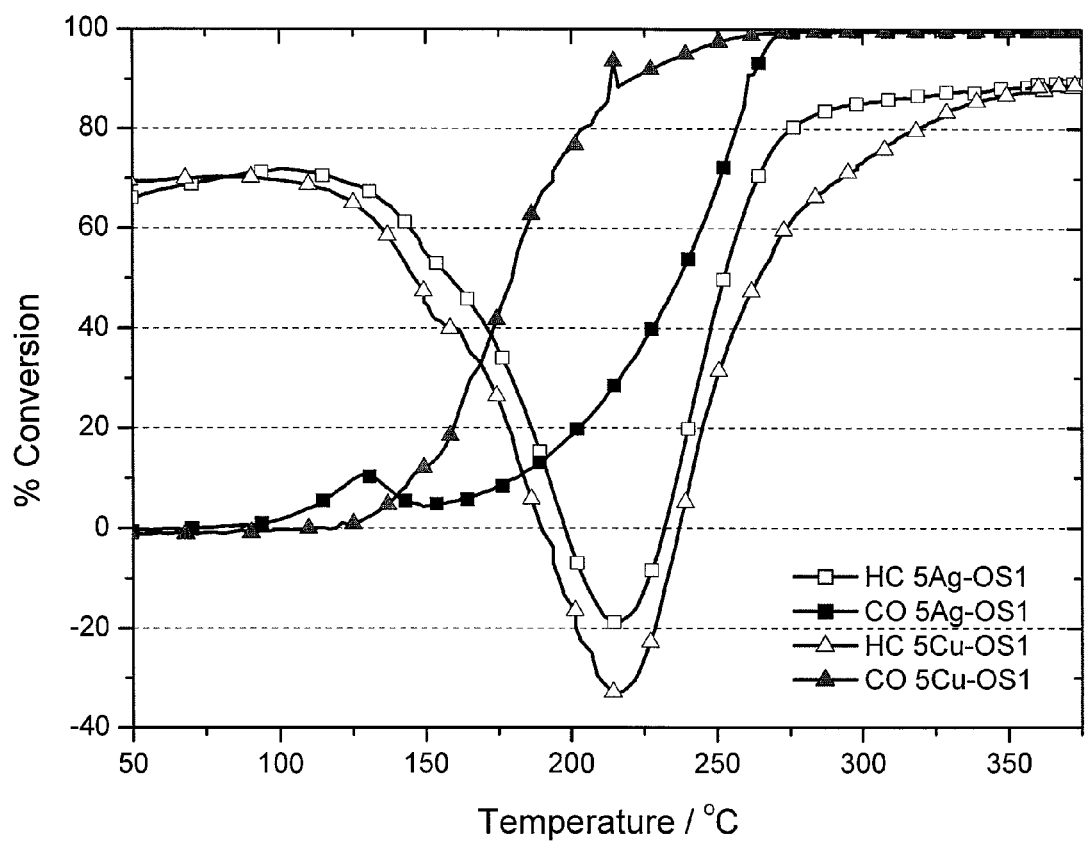

Figure 3: CO and HC Light-off on SGB for 5Cu-OS1 vs 5Cu-OS2 (0.5g Zeolite β inlet // 1.5 g OS outlet).
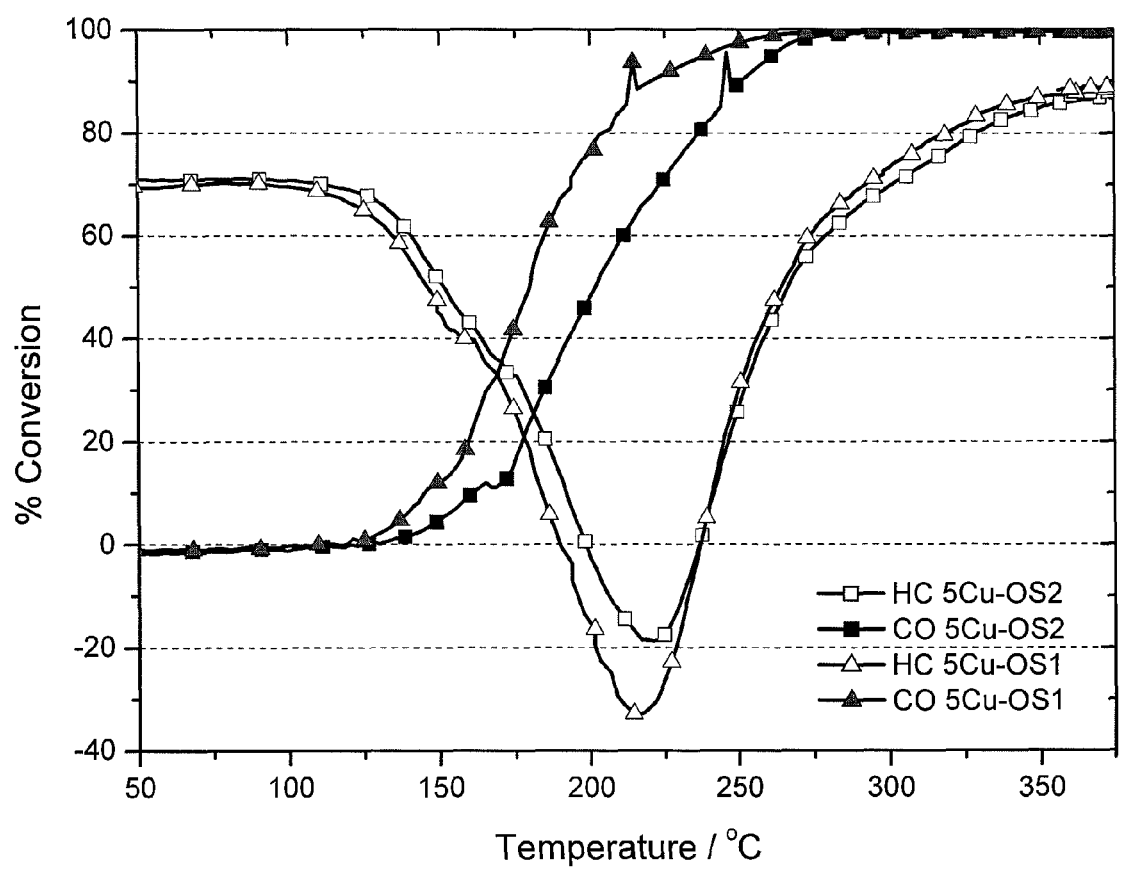

Figure 4: CO bar chart comparison for SGB light-off testing.
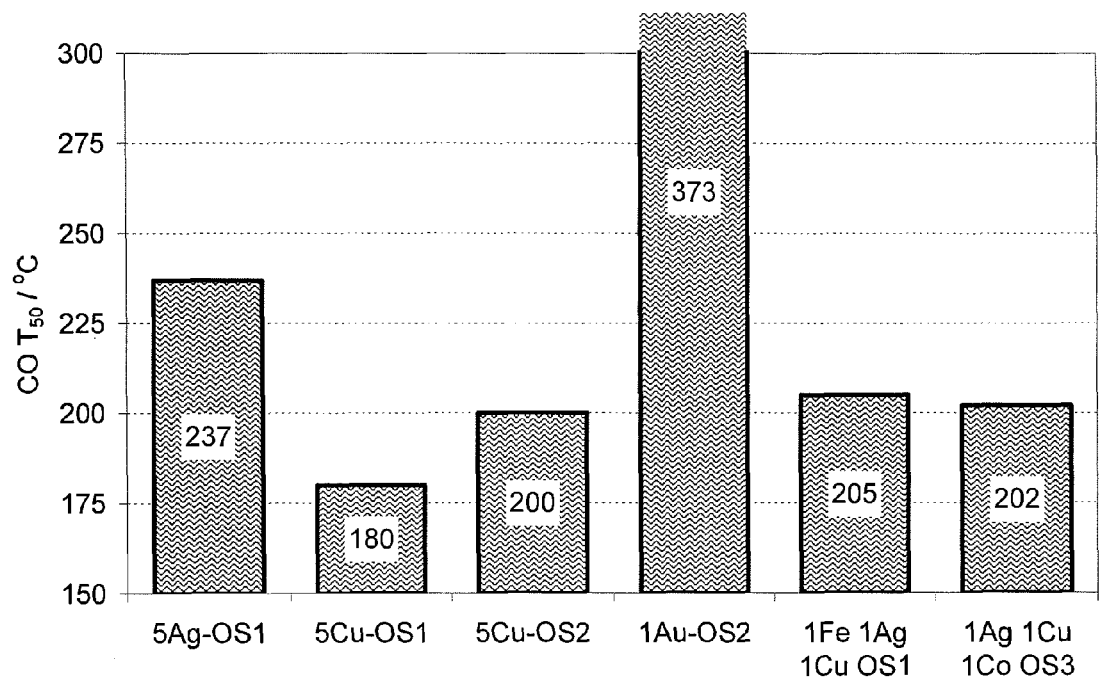

Figure 5: 5wt%Cu-OS3 vs Pt DOC @ 70 gcf for SGB light-off testing and aging. (0.7g Zeolite β inlet // 1.3 g catalyst outlet).
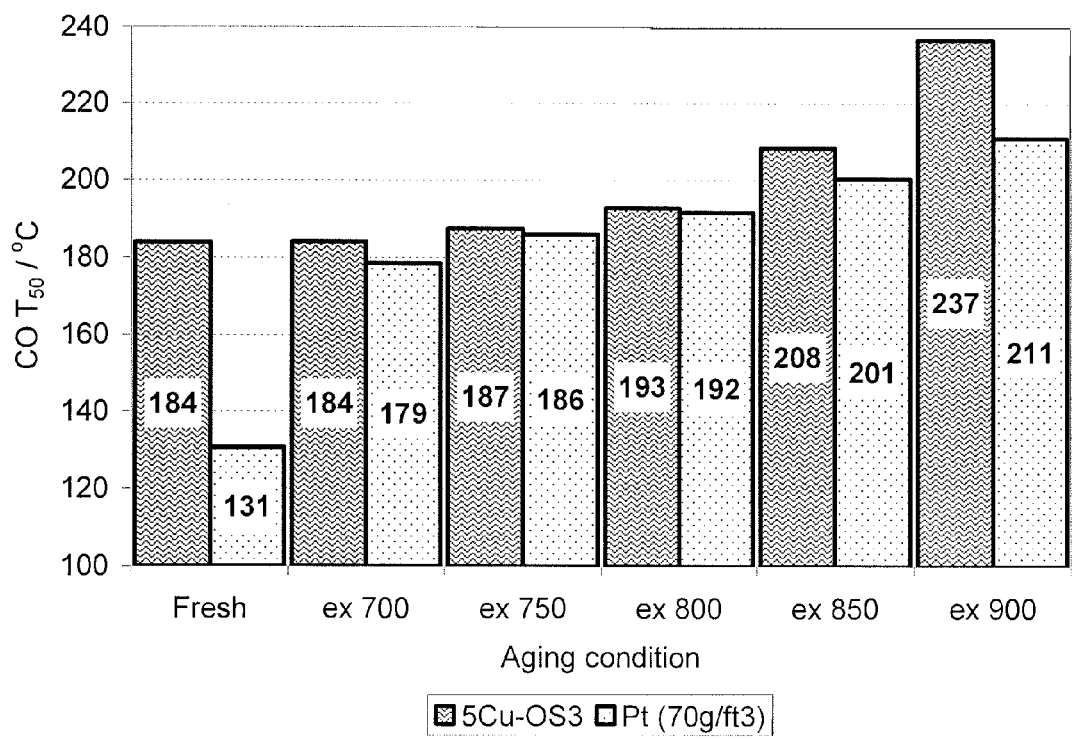

Figure 6: 5wt%Cu-OS3 mixed with Pt DOC (Pt = 35gcf) vs DOC @ 70 gcf for SGB light-off testing and aging. (0.7g Zeolite β inlet // 1.3 g catalyst outlet).
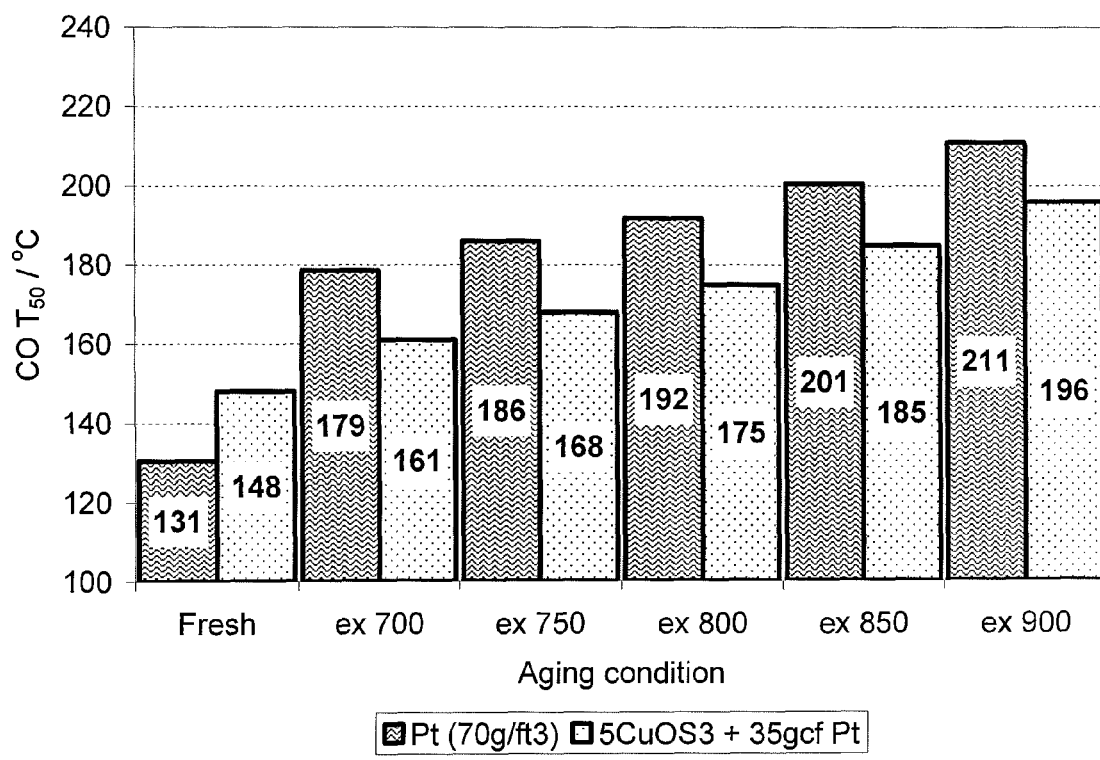

Figure 7: 5Cu-OS3 mixed with Pt DOC (35gcf) vs DOC @ 120 gcf for SGB light-off testing and aging (0.7g Zeolite β inlet // 1.3 g catalyst outlet).
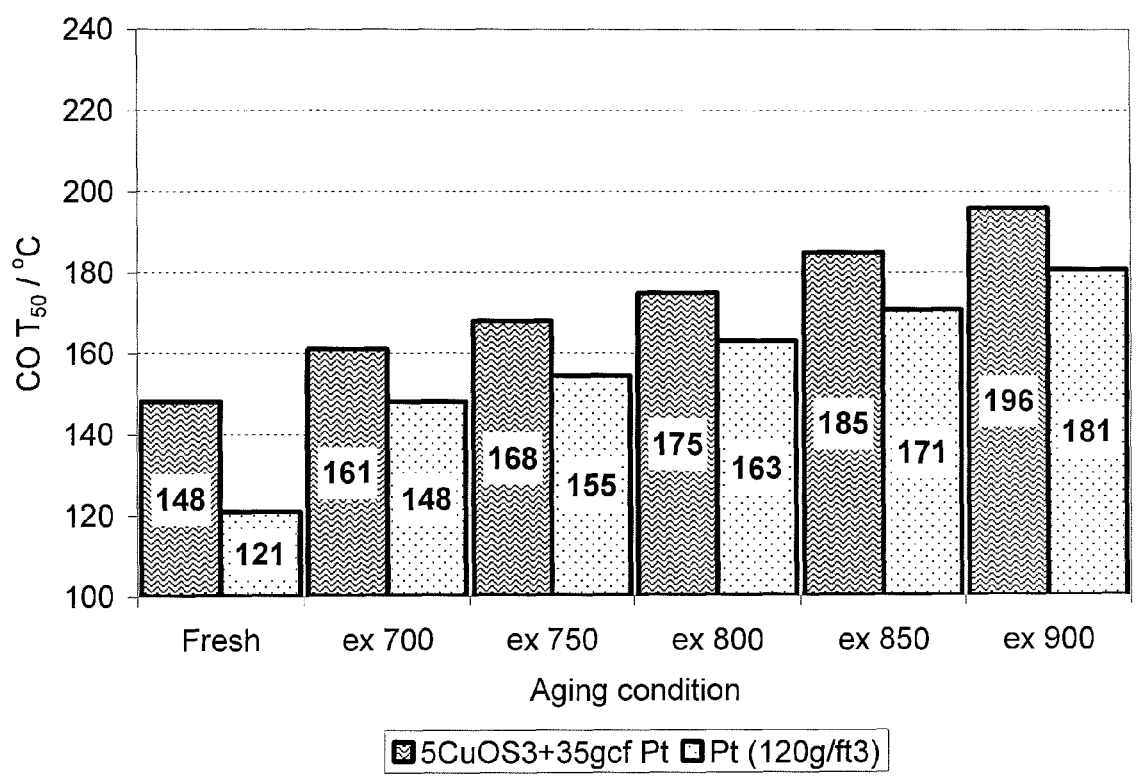

Figure 8: Impact of SOx on DOC core performance in SGB light-off testing, 5ppm SO2 in rise 3 / 4 (ca. 50 ppmw fuel sulphur).
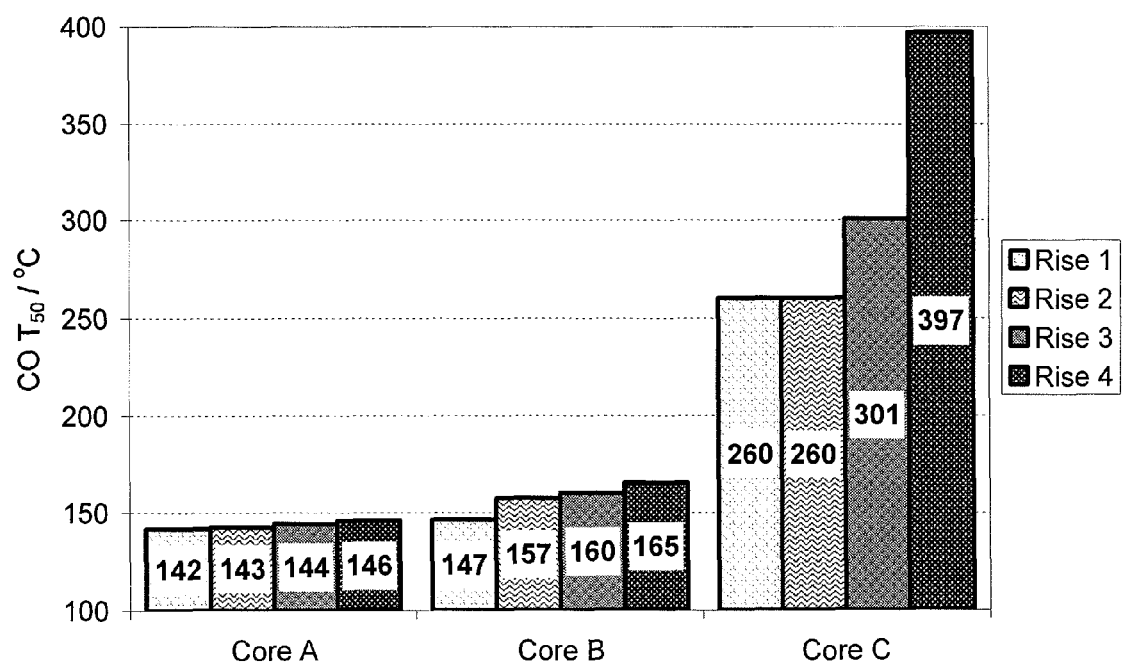

Figure 9a: Dynamometer Aging and Testing trial for initial samples: CO Performance. (1000 ppm CO / 200 ppm HC (C1)/ 250 ppm NOx / ramp 20 °C/min, GHSV ca. 85 h$^{-1}$)
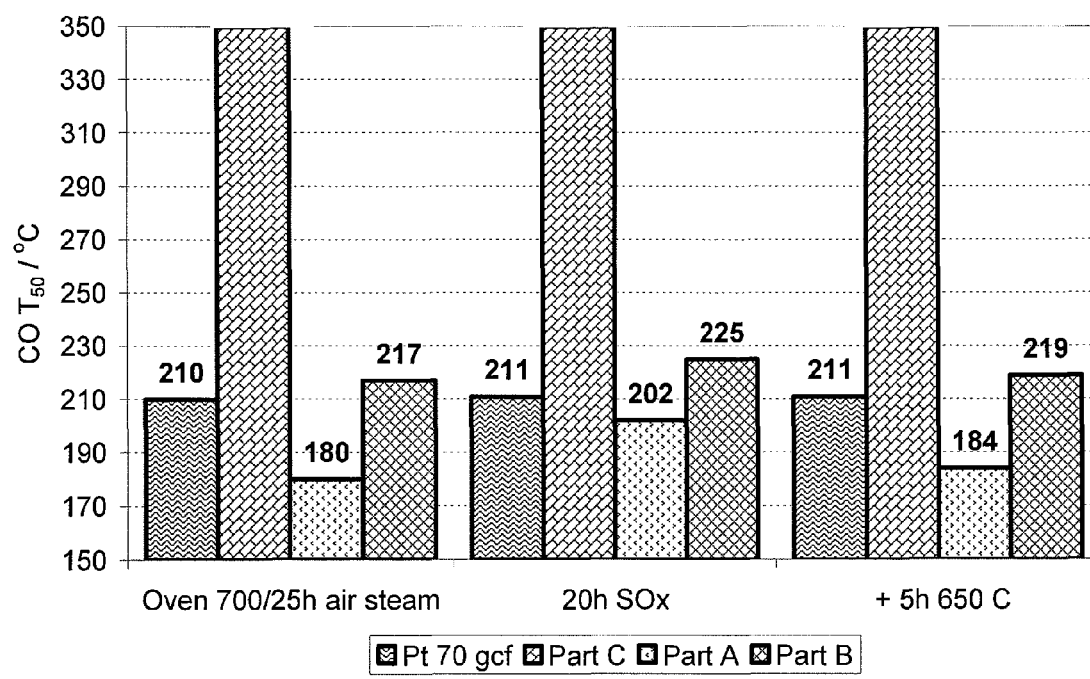

Figure 9b: Dynamometer Aging and Testing trial for initial samples: HC Performance. (1000 ppm CO / 200 ppm HC (C1)/ 250 ppm NOx / ramp 20 °C/min GHSV ca. 85 h$^{-1}$)
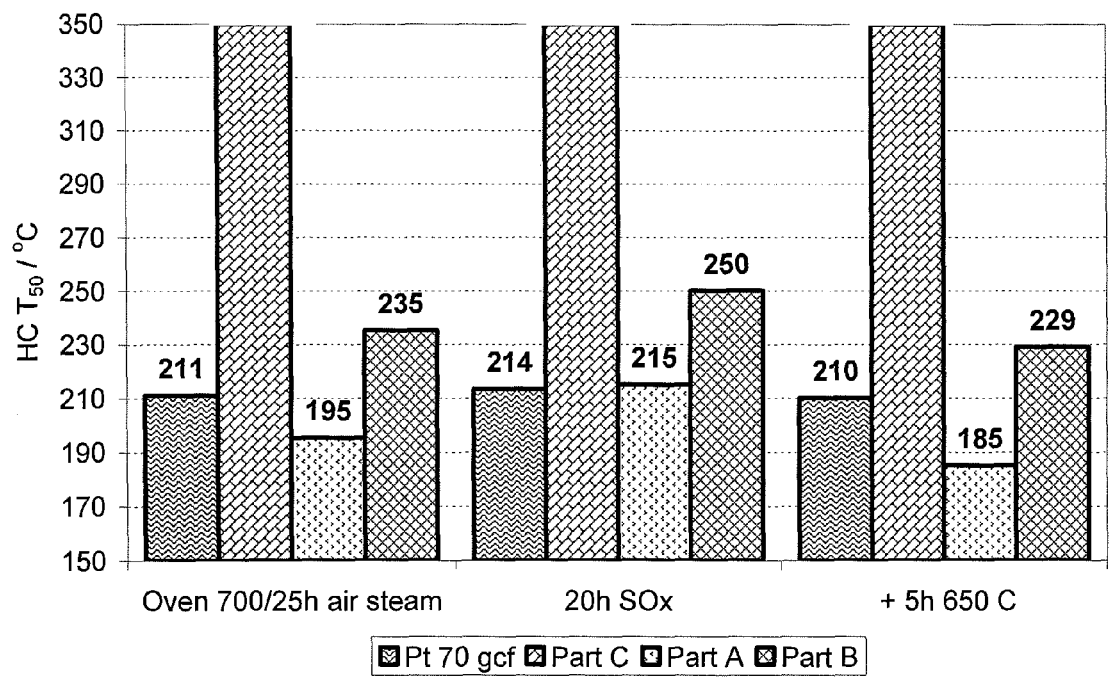

Figure 10: Vehicle Performance comparison for initial samples.
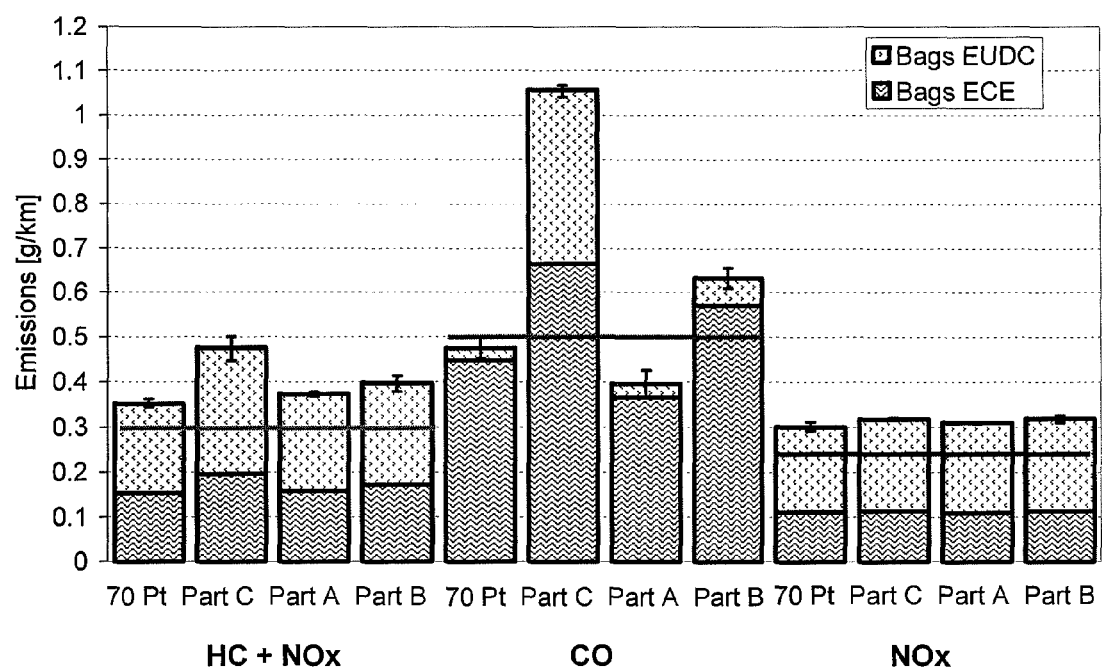

Figure 11: Reactivation after SOx aging for Part A (60 gcf PtPd @ 2:1) from initial trials. Dyno Aging and testing conditions as per Figure 9a / 9b.
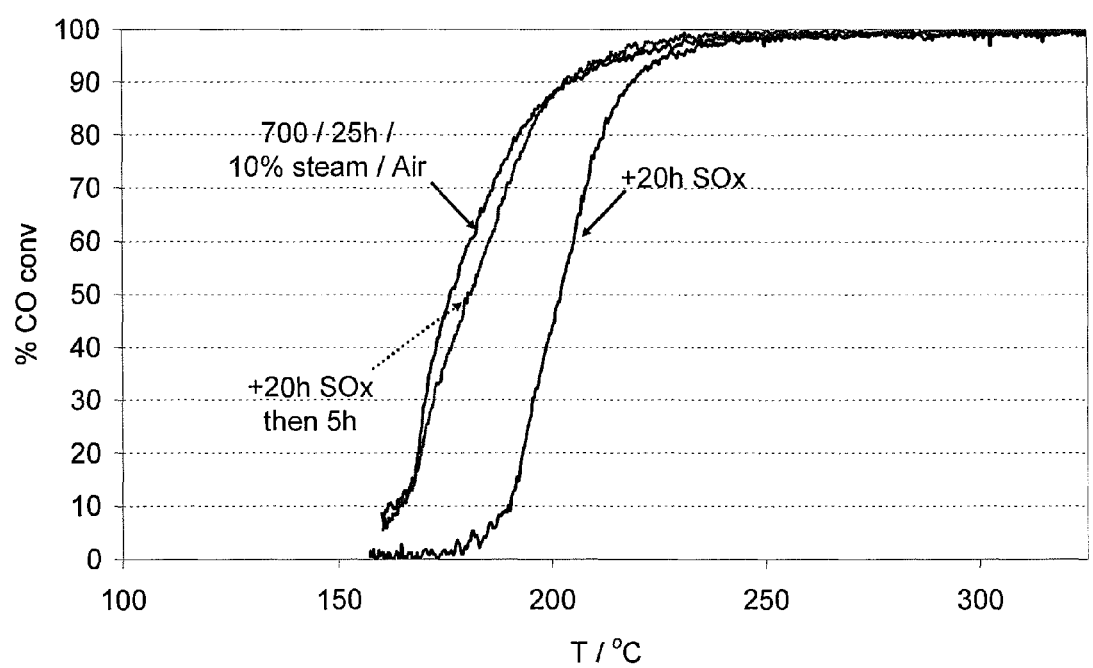

Figure 12: Dynamometer Aging and Testing: Split brick / zone to overcome deactivation of base metal component 2Cu-OS3 (Part C). Dyno Aging and testing as per Figure 9a / 9b.
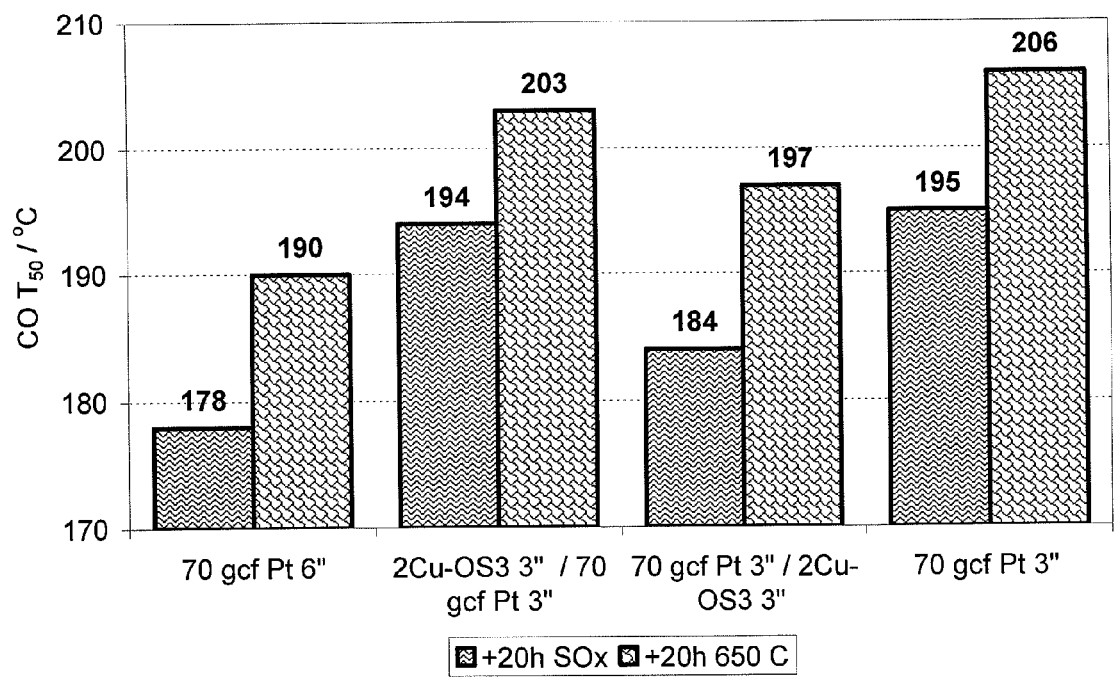

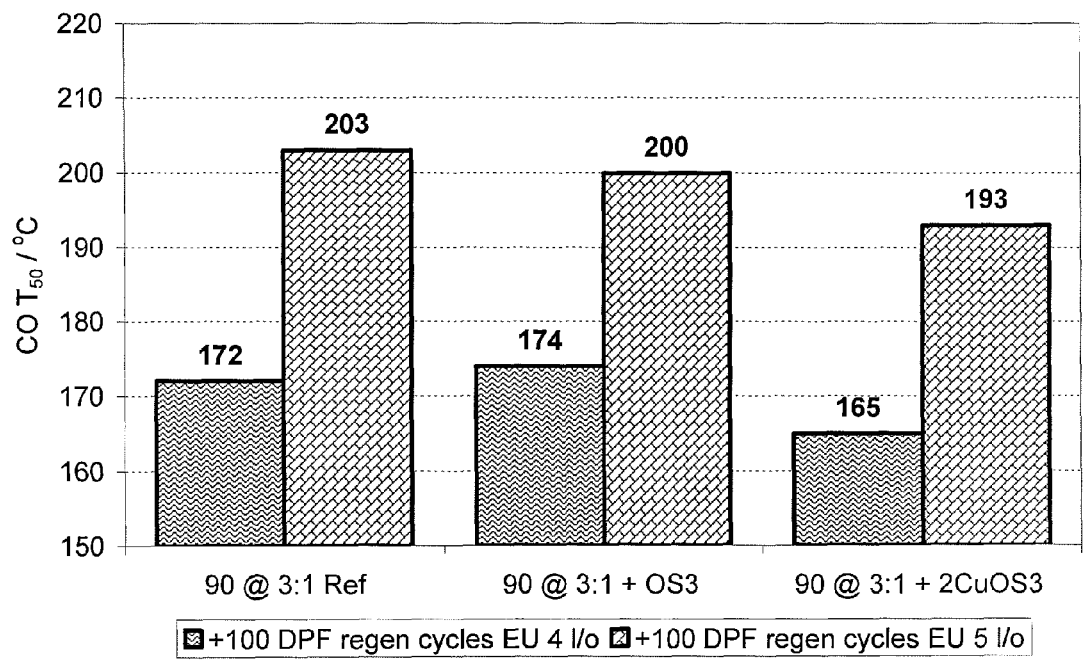
Figure 13: Dynamometer Aging and Testing 90gcf 3:1 + 2Cu-OS3 vs OS3 and reference.

Figure 14: Dynamometer Aging and Testing trial initial parts versus commercial PtPd DOC 60 gcf @ 2:1 (Part D). Dyno Aging and testing as per Figures 9a/ 9b and 13.
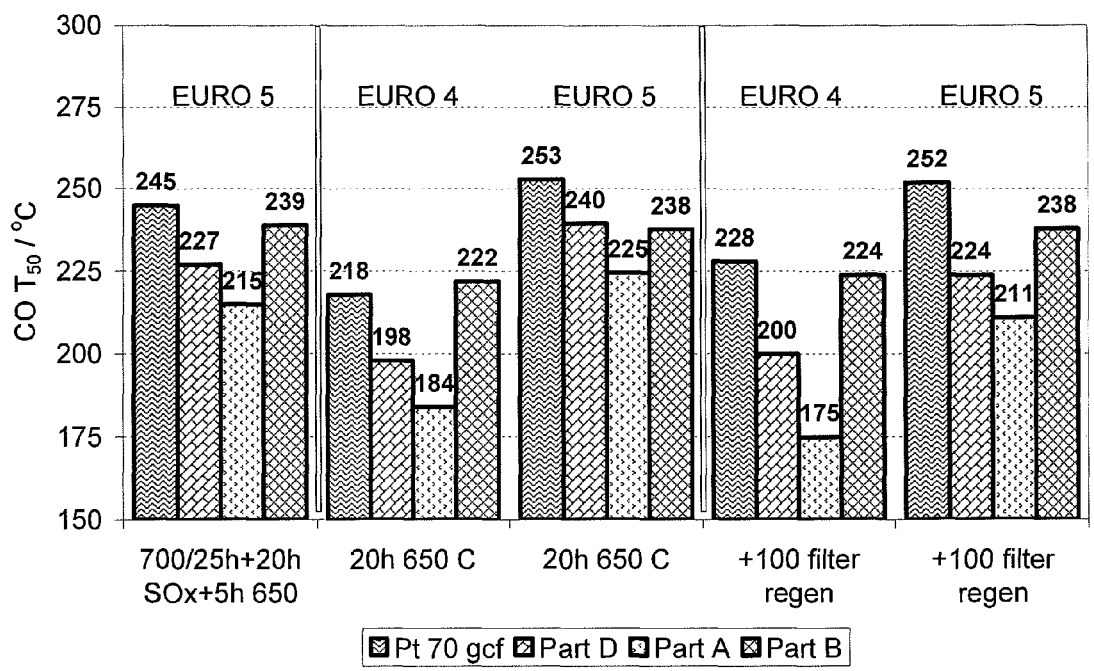

Figure 15: Vehicle Performance comparison 2: PtPd DOC @ 60 2:1 (Part A – 60 + BM) ex oven aging showing benefit of 2Cu-OS3 containing part vs reference.
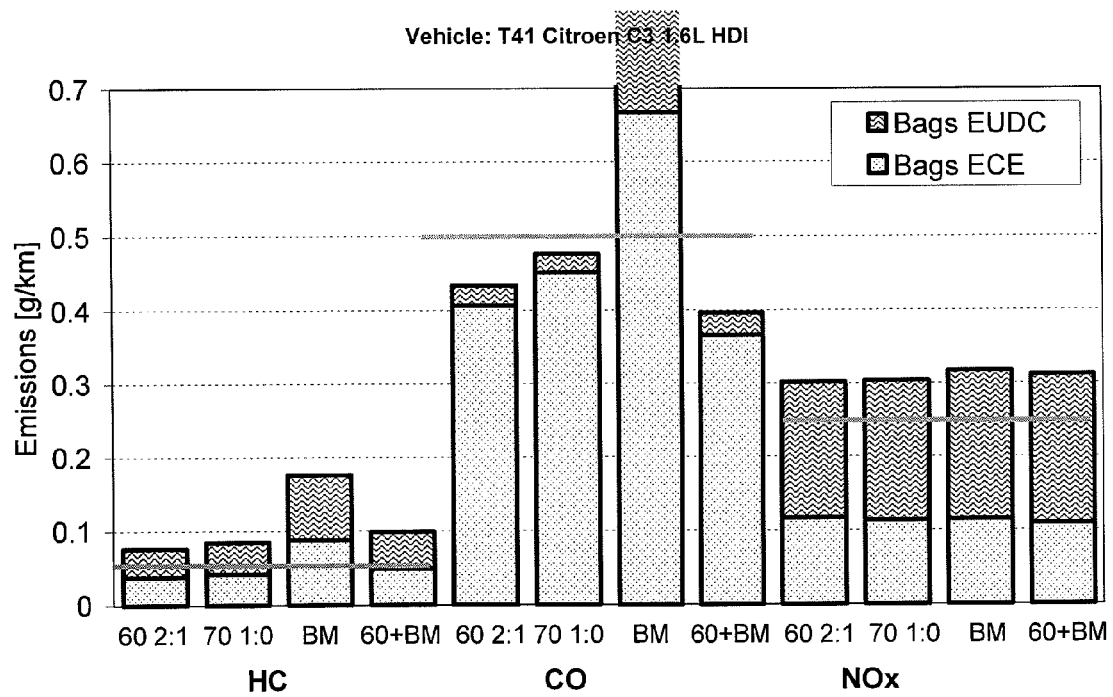

Figure 16: Dynamometer Aging and Testing trial: low PGM content DOC comparison. Aging and testing conditions as defined in Figure 9a / 9b.
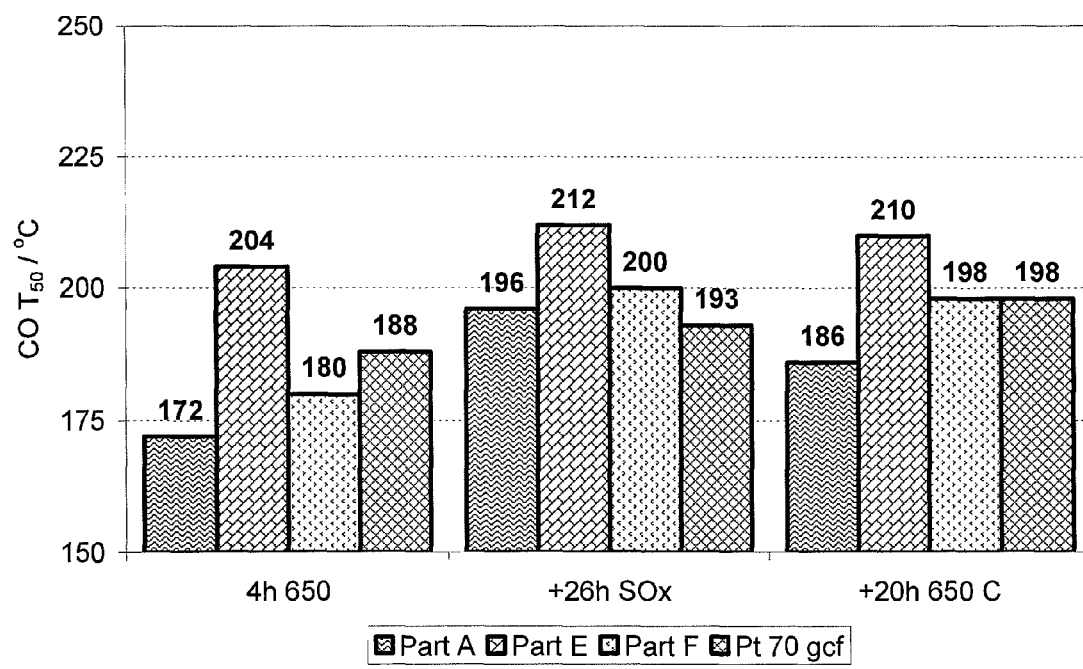

Figure 17: Dynamometer Aging and Testing 30 gcf PtPd @ 2:1, reference Part G versus parts with 2Cu-OS3 as separate layer (Part F), or in single layer (Part H).
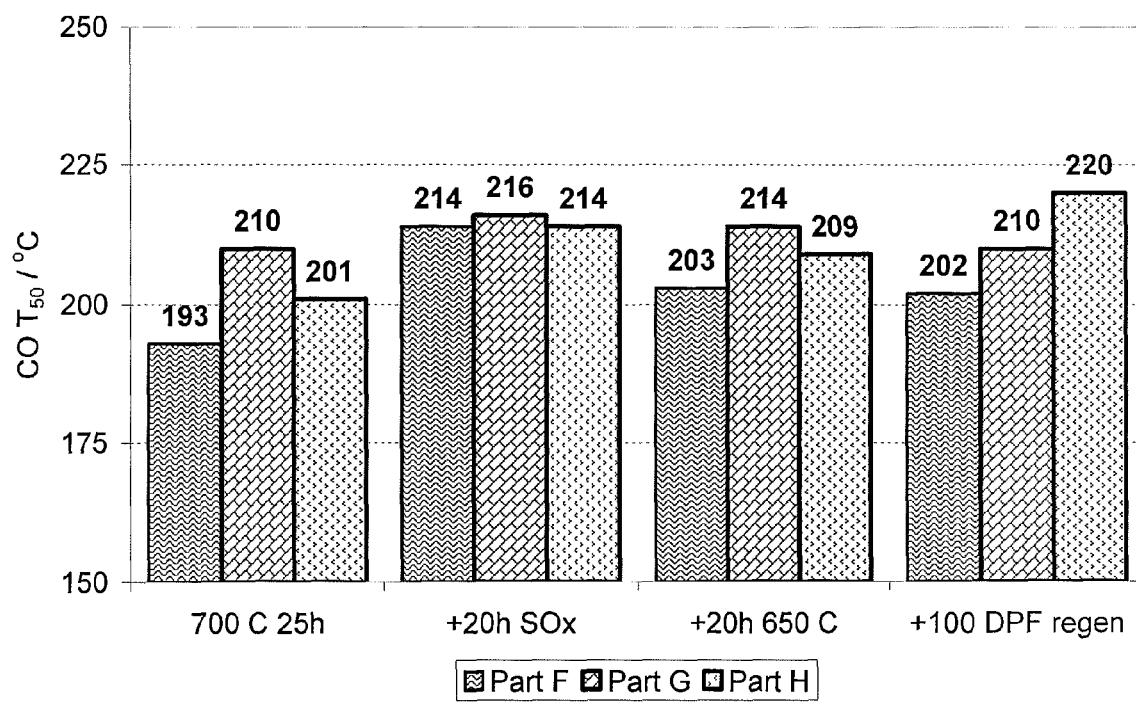

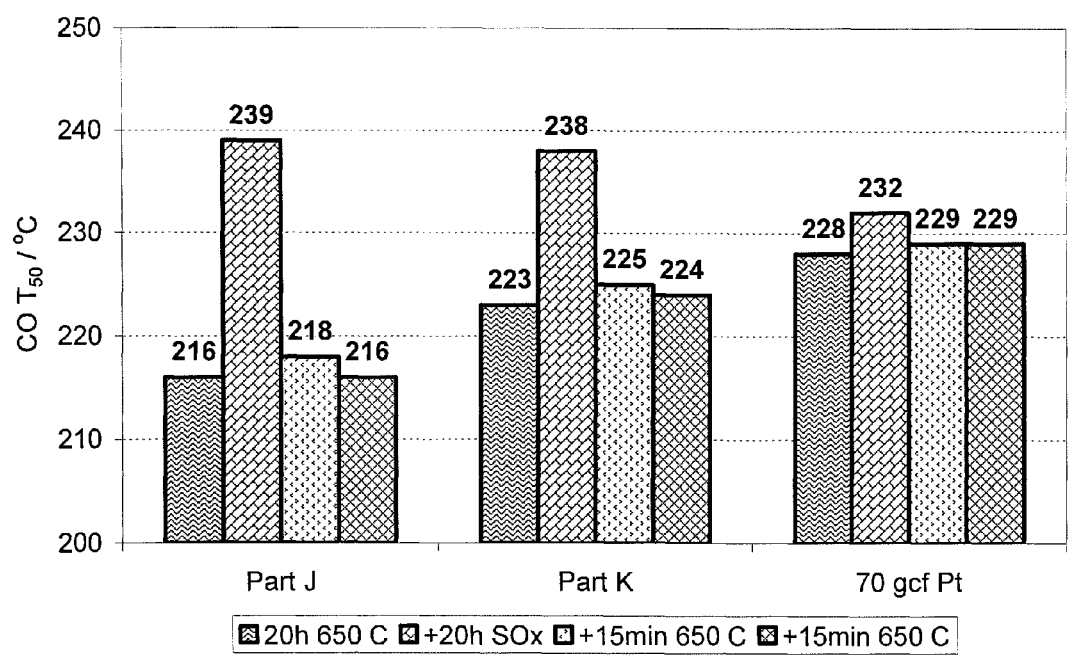
Figure 18: Dyno Aging and Testing, SOx poisoning and DeSOx for 70 gcf Pt reference, 70 gcf Pt + 2Cu-OS3 and PtPd + 2Cu-OS3. Conditions as per Figures 9a/9b.

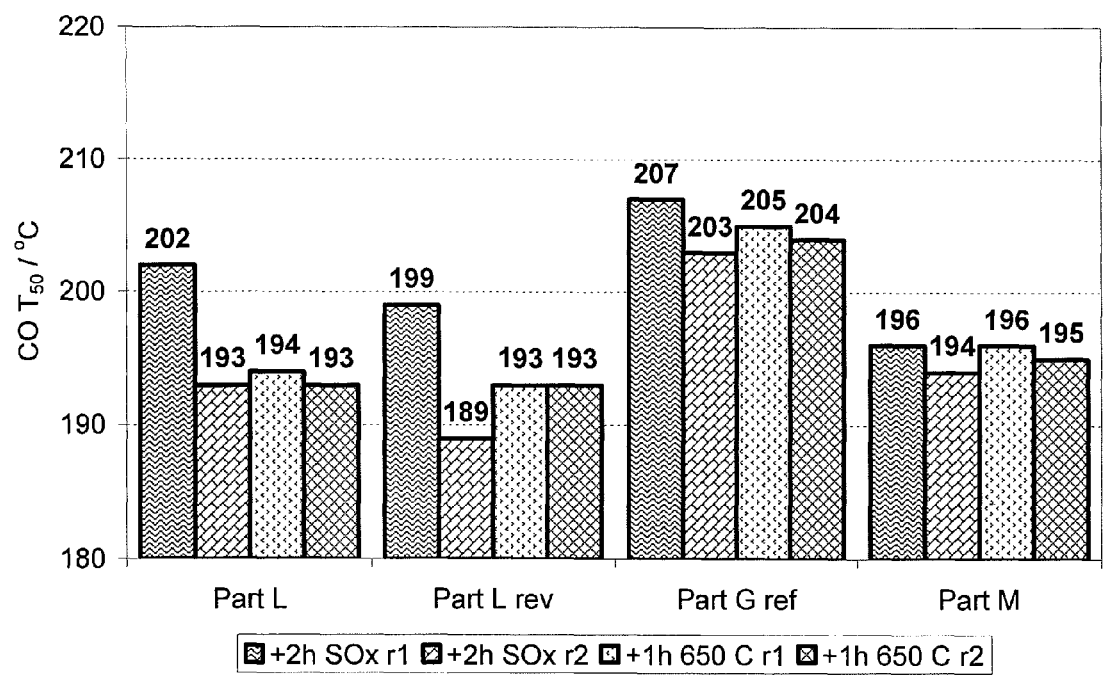
Figure 19: Dynamometer Aging and Testing trial: effect of zone coating on SOx / DeSOx for 30 gcf Pt:Pd 2:1 with base metal. Conditions as defined in Figures 9a/9b.

Figure 20: Dynamometer Aging and Testing trial: effect of zone coating on SOx / DeSOx during light-off and after filter regeneration aging for PtPd DOC @ 30 2:1.
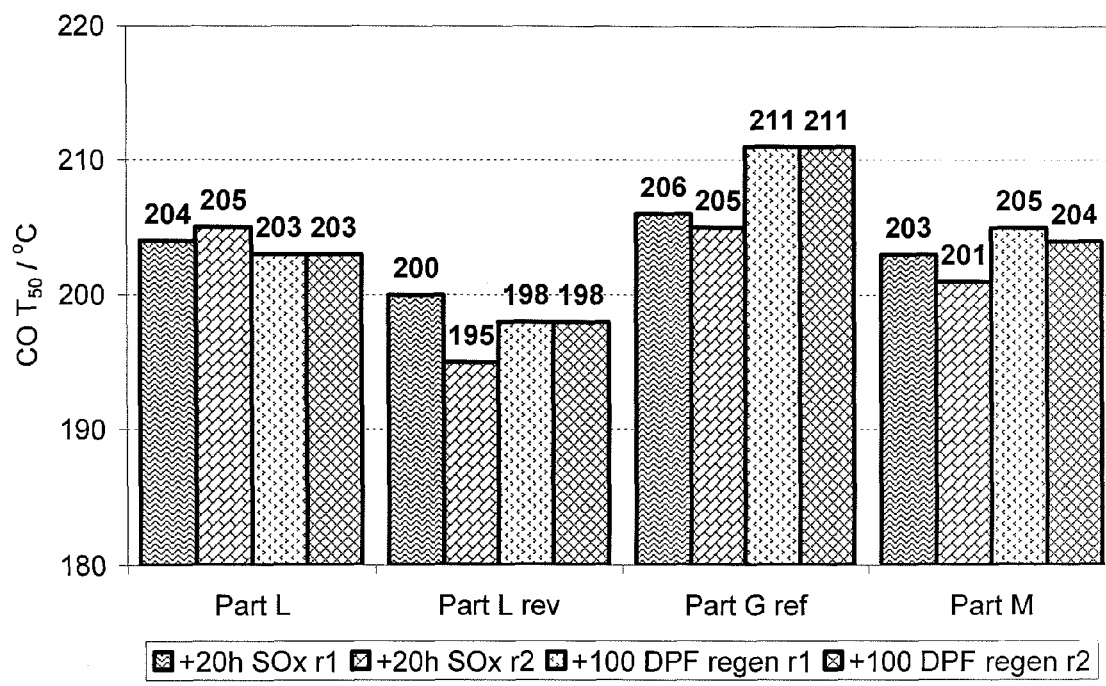

BASE METAL AND BASE METAL MODIFIED DIESEL OXIDATION CATALYSTS

REFERENCE TO RELATED APPLICATIONS

This application claims the benefit of provisional application 61/039,879 filed Mar. 27, 2008 and is a continuation-in-part of application Ser. No. 12/240,170 filed Sep. 29, 2008, now abandoned and application Ser. Nos. 12/363,310 and 12/363,329 both filed Jan. 30, 2009 all of which are relied on and incorporated herein by reference.

INTRODUCTION AND BACKGROUND

Exhaust emissions from motor vehicles are a significant source of air pollution and are major contributors to the photochemical smog and ozone events which have been correlated to significant adverse impacts on health (M. V. Twigg, Applied Catalysis B, vol. 70, (2007), p 2-25). Hence over the last thirty years increasingly stringent legislative limits have been introduced to regulate the emissions from both petrol/gasoline and diesel internal combustion engines e.g. Euro 5 or Euro 6 (Regulation (EC) No 715/2007 of the European Parliament and of the Council, 20 Jun. 2007, Official Journal of the European Union L 171/1, see also Twigg, Applied Catalysis B, vol. 70 p 2-25 and R. M. Heck, R. J. Farrauto Applied Catalysis A vol. 221, (2001), p 443-457 and references therein). The most significant gaseous vehicular emissions comprise pollutants such as carbon monoxide (CO), oxides of nitrogen (NO and $NO_2$ collectively NOx), and unburnt hydrocarbons (HC). To achieve the legally required remediation goals, exhaust after-treatment technologies have been developed for both gasoline and diesel engines. These technologies include, but are not limited to, engine control methodologies/modification, alternate combustion cycles and the use of after-treatment systems e.g. catalytic control devices which eliminate exhaust pollutants by promoting chemical changes to convert unwanted compounds into more benign species. In the case of diesel/compression ignition engines the latter devices include the Diesel Oxidation Catalyst (DOC), Diesel NOx Trap/NOx Storage Catalyst (DNT/NSC) and Selective Catalytic Reduction catalyst (SCR) to address emissions of CO, HC (DOC) and NOx and the use of the Catalysed Diesel Particulate Filter (CDPF) for the removal and combustion of entrained solids, also known as particulate matter or soot.

Of the aforementioned catalytic systems for diesel emission control the DOC is both the most widely studied and implemented technology (for examples see U.S. Pat. No. 5,371,056, U.S. Pat. No. 5,462,907, U.S. Pat. No. 6,153,160, U.S. Pat. No. 6,274,107, J. A. A. van den Tillaart, J. Leyrer, S. Eckhoff and E. S. Lox in Applied Catalysis B Vol 10, 1-3, p 53-68). Current 'conventional' DOCs comprise a refractory oxide support e.g. Alumina, a hydrocarbon storage/release component to enhance low temperature performance, typically a Zeolite (Applied Catalysis B, vol. 70, (2007), p 2-25, Applied Catalysis A vol. 221, (2001), p 443-457) and an active Precious Group Metal (PGM) or metals, initially Pt or more recently the combination of Pt/Pd as the primary catalytic materials e.g. see U. Neuhausen, K. V. Klementiev, F.-W. Schütze, G. Miehe, H. Fuess and E. S. Lox in Applied Catalysis B: Environmental, Vol 60, 3-4, (2005), p 191-199 and references therein. The choice of these metals is based upon their ability to offer the highest turnover (number of reactions per second) with respect to the oxidation of CO and Hydrocarbon to $CO_2$ and water at low temperatures and low concentrations of active component within the DOC formulation.

The requirement of the DOC with respect to direct control of gaseous emission has been augmented over time to meet specific new challenges arising from each generation of legalisation, e.g. the ability to efficiency combust post-injected HCs to generate the thermal 'bloom' required to initiate DPF regeneration or more recently the ability to oxidise NO to $NO_2$ in order to facilitate low temperature $NH_3$—SCR chemistry. Moreover, this multi-functionality must be incorporated without detriment to the primary role of the DOC for effective emission control i.e. the DOC must posses a Low Temperature 'light off'. Thus in addition to such multi-functionality the DOC must provide operation at low temperatures to minimise 'cold-start' emissions. This requirement is especially critical given the increasingly lower temperature window of operation of the current and next generation diesel engines, which present increasing CO and HC emissions arising from the increased use of exhaust gas recirculation or advanced combustion cycles employed to decrease engine out NOx levels (patent WO/2005/031132, Method and Apparatus for Providing for High EGR Gaseous-Fuelled Direct Injection Internal Combustion Engine). This challenge is rendered yet more difficult due to the intrinsic kinetics of CO oxidation, wherein higher concentrations of CO are self-inhibitory to the rate of oxidation (A. Bourane and D. Bianchi J. Catalysis 222 (2004) 499-510 and references therein). A further and final requirement is that the DOC must maintain this high level of activity after exposure to transient high temperatures in the presence of steam as occurs for a close-coupled catalyst or during the active regeneration strategy required for the DPF, as a result of the exotherm generated in the DOC by the combustion of post-injected hydrocarbons.

In order to fulfil the aforementioned targets, and also comply with end-of-life performance targets, it has therefore been necessary to increase the PGM content of conventional DOCs. This in turn has increased demand for Platinum (Pt) and Palladium (Pd) resulting in further price pressure for these PGMs and also for vehicle manufacturers. Hence what are required to alleviate these issues are alternative, more cost effective, base metal catalysts to replace or augment the conventional PGM function in the DOC. These base metal catalysts must offer competitive, hydrothermally durable and poison resistant activity under the diverse conditions of the diesel exhaust environment.

SUMMARY OF THE INVENTION

The present invention provides a new class of base metal DOC and base metal modified DOC systems which can address these challenges. This improved technology is realised by the inclusion of a new generation of Base Metal Ion Exchanged Oxygen Storage (OS) materials and offers significant performance improvements in an apparatus for the lower temperature catalytic oxidation of CO, either it solely or in combination with conventional PGM containing DOCs. The particular combination of doped OS CO oxidation catalyst with the conventional PGM-based activity provides a synergy which enables high conversion of pollutants at lower temperatures and with increased hydrothermal durability.

These novel redox active materials, described in U.S. application Ser. Nos. 12/363,310 and 12/363,329 and SAE paper 2008-01-0481, have been found to additionally generate synergistic performance benefits for CO oxidation with the added benefit of providing enhanced hydrothermal durability for the DOC with respect to CO Light-off (temperature required for 50% conversion). The doped OS materials herein are based upon $CeZrO_x$ solid solutions containing a substantially phase pure Cubic Fluorite structure and are produced by the specific ion exchange of base metals i.e. non-precious group metals. The range of appropriate materials and full details regarding execution of the ion exchange are described elsewhere (U.S. application Ser. Nos. 12/363,310 and 12/363, 329). The mode of ion exchange, without wishing to be bound by theory, essentially involves the introduction of active metal/cations into the solid solution under chemically basic i.e. conditions of high pH, that is say high OH$^-$/low Hydronium ($H_3O^+$) or proton ($H^+$) content. As demonstrated in the previous work, the resultant materials demonstrate high activity and hydrothermal durability in contrast to any promotion realised by conventional impregnation of an acidic metal e.g. metal nitrate, where formation of bulk oxide phases in fresh materials and rapid sintering of such oxide phases, with resultant deactivation, is the norm. The proposed exchange of the $H^+$ species by metal ions enables the incorporation and stabilisation of specific mono-valent (e.g. $K^+$), di-valent (e.g. $Cu^{2+}$), tri-valent (e.g. $Fe^{3+}$) and higher valence ions at high dispersion within the oxide matrix. The choice of base metals thus incorporated can be based upon oxides known to be active for reactions of especial interest or catalytic importance. Metals of specific catalytic significance include Ag, Cu, Co, Mn, Fe, alkali metals, alkaline earth metals or transitions metals, or other metal or metalloid known to form a stable nitrate $NOx_{ads}$ which can undergo subsequent decomposition and reduction to $N_2$ under conditions within the conventional operational window of the vehicle exhaust. The term transition metal refers to the 38 elements in Groups 3-12 of the Periodic Table of Elements.

Oxygen Storage (OS) materials are well known solid electrolytes based on, for example, Ceria-Zirconia ($CeZrO_x$) solid solutions. They are a ubiquitous component of aftertreatment catalysts for gasoline vehicles due to their ability to 'buffer' the active components in the catalyst against local fuel rich (reducing) or fuel lean (oxidising) conditions. OS materials do this by releasing active oxygen from their 3-D structure in a rapid and reproducible manner under oxygen-depleted transients, regenerating this 'lost' oxygen by adsorption from the gaseous phase when oxygen rich conditions arise. This reduction-oxidation (hereafter redox) chemistry is attributed to the $Ce^{4+} \leftrightarrow Ce^{3+}$ redox couple, with the oxidation state of Ce depending upon local $O_2$ content. This high availability of oxygen is critical for the promotion of generic oxidation/reduction chemistries e.g. CO/NO chemistry for the gasoline three-way catalyst, or more recently for the direct catalytic oxidation of particulate matter (soot) in the catalysed diesel particulate filter (CDPF) e.g. US2005 0282698 A1.

Hence there have been extensive studies on the chemistry, synthesis, modification and optimisation of Ce—Zr based OS materials. For example, the use of Ceria-Zirconia materials doped with lower valent ions for emission control applications have been extensively studied e.g. U.S. Pat. No. 6,468, 941, U.S. Pat. No. 6,585,944 and US2005 0282698 A1. These studies demonstrate that lower valent dopant ions such as Rare Earth metals e.g. Y, La, Nd, Pr, etc., Transition metals e.g. Fe, Co, Cu etc. or Alkaline Earth metals e.g. Sr, Ca and Mg can all have a beneficial impact upon oxygen ion conductivity. This is proposed to arise from the formation of oxygen vacancies within the cubic lattice of the solid solution which lowers the energy barrier to oxygen ion transport from the crystal bulk to the surface thereby enhancing the ability of the solid solution to buffer the air fuel transients occurring in the exhaust stream of a typical gasoline (three-way) catalyst application.

Additionally it has been shown (U.S. Pat. No. 6,468,941 and U.S. Pat. No. 6,585,944) that the use of specific examples of the above dopants can provide full stabilisation of the preferred Cubic Fluorite lattice structure for Ceria-Zirconia solid solutions, with Y having been identified as having particular benefit. The presence of the preferred Cubic Fluorite structure has been found to correlate with the most facile redox chemistry for $Ce^{4+} \leftrightarrow Ce^{3+}$, from both the surface and bulk of the crystal, thus dramatically increasing the oxygen storage and release capacity, as compared to bulk $CeO_2$. This benefit is especially pronounced as the material undergoes crystal growth/sintering due to the hydrothermal extremes present in typical exhaust environments. The incorporation of especially Y and to a lesser extent La and Pr have also been demonstrated to limit or, in certain cases, circumvent the disproportionation of the single cubic phase Ceria-Zirconia into a composite consisting of more Ce-rich cubic phases and more Zr-rich tetragonal phases, a process which results in marked decrease in redox function, surface area etc. of the solid solution.

Finally U.S. Pat. No. 6,468,941, U.S. Pat. No. 6,585,944, Ser. Nos. 12/363,310 and 12/363,329 teach the potential for employing base i.e. non-precious group (Pt, Pd, Rh, Au etc.) dopant metals into the Cubic Fluorite lattice either by direct synthetic method (U.S. Pat. No. 6,468,941, U.S. Pat. No. 6,585,944) or by an ion exchange post modification (U.S. application Ser. Nos. 12/363,310 and 12/363,329). The modification of the solid solution via these methods has been demonstrated as an alternative means to promote the redox chemistry of Ce, with Fe, Ni, Co, Cu, Ag, Mn, Bi and mixtures of these elements being identified as of particular interest. Hence while non-promoted OS materials typically exhibit a redox maximum, as determined by $H_2$ Temperature Programmed Reduction (TPR), at ca. 600° C., the inclusion of base metals within the lattice can decrease this temperature by >200° C. or more at a fraction of the cost incurred by the use of precious metals. Thus by analogy we propose that this dramatic enhancement of O ion transport and reactivity is equally applicable to the oxidation of CO as it is to the oxidation of $H_2$. Hence by inclusion of these active base metal oxides within a conventional DOC it becomes possible to decrease the temperature required for catalyst light-off.

However, while these base metals can be beneficially incorporated in the CeZrOx lattice and this incorporation can significantly promote low temperature redox function for fresh materials, the addition of these elements can also decrease fresh and aged phase purity and significantly decrease hydrothermal durability (promote crystal sintering and material densification), leading to losses in aged performance cf. base compositions without additional base metal. In addition during conventional aging cycles reactions may occur between the gas phase and the CeZrOx material which can result in extraction of these additional base elements from the Cubic Fluorite lattice. This in turn can result in formation of separate bulk phase(s) with low intrinsic catalytic activity or in a worst case scenario, phases which directly interact with the OS or other catalyst component resulting in a direct or indirect poisoning of the catalyst. Hence until recently, particular synthetic care was required to enable the incorporation of promotant lower valent ions into the Cubic Fluorite structure while ensuring both the electrical neutrality and phase preservation. Thus, as shown in U.S. application Ser. No. 12/363,310 the synthesis of an OS material containing a specific low valent base metal promoter (Ag) 'doped' into a Cubic Fluorite structure with ca. 40 wt % Ce resulted in phase disproportionation into Ce-rich and Ce-poor domains, with a marked decrease in redox performance. This contrasted with a newly developed basic exchange process which was able to provide an equivalent composition with high activity and hydrothermal durability for use in diesel emission control catalysts. This combination of enhanced oxidation and hydrothermal durability thereby provide desirable performance improvements for commercial application.

Benefits and features include:

a) Provision of a 'stand-alone' base metal DOC or of a base metal component able to operate in a synergistic manner within a conventional DOC technology to promote lower temperature oxidation of CO.

b) Improved CO oxidation performance ascribed to the high dispersion of the promoting base metal sites within the $CeZrO_x$ resulting in high accessibility of the gaseous reactants to active O species.

b) Provision of an active base metal component to enable said improved activity at equal PGM content or equivalent performance at decreased PGM cost.

c) Improved hydrothermal durability versus conventional DOC formulation due to the highly robust nature of the base metal promoter.

d) The ability to take advantage of pre-formed OS materials with desirable structural and textural properties e.g. single phase cubic systems, meso-porous systems of high and durable pore volume and SA and hence further enhance the associated performance benefits of post-modification.

e) The potential for great flexibility in chemical modification without disruption of lattice parameter, phase purity, defect density, surface acidity/basicity etc.

f) The robust synthesis allows specific-post modification of generic pre-existing commercial materials to produce a range of tailored and bespoke materials with characteristics and properties "tuned" to the specific application.

This strategy contrasts with that employed in the conventional DOC systems wherein inclusion of base metal component e.g. 'bulk $CeO_2$ as the catalytically active component, is reported for the catalytic oxidation of the liquid portion of the particulates' (quote from R. J. Farrauto, K. E. Voss, Applied Catalysis B, Vol 10, 1-3, 14 (1996), p 29-51 see also U.S. Pat. No. 5,462,907, U.S. Pat. No. 6,153,160, U.S. Pat. No. 6,248, 684, U.S. Pat. No. 6,255,249 and U.S. Pat. No. 7,078,004). Hence a second novel feature of this invention is the inclusion of an active component for the direct oxidation of CO with associated benefits, which is atypical of the impact of the addition of $CeZrO_x$ OS compounds on the hydrothermal durability of DOC formulations.

Certainly the use of copper or other base metal(s) in combination with cerium oxide is not unique. Indeed such systems have been widely examined for a range of applications e.g. see J. Catal. Vol. 230 (2), 2005, P464-475 (steam reforming of methanol of $Cu/ZrO_2/CeO_2$), Applied Cat. A, Vol. 331, 2007, P112-120 (PGM doped $CuO$—$CeO_2$ catalyst for selective oxidation of CO in $H_2$-rich streams) or Catalysis Comm. Vol. 8 (12), 2007, P2110-2114 (diesel soot oxidation with a $NO/O_2$ mixture). However, herein it will be demonstrated that both the manner of introduction of the base metal and the benefits demonstrated by the resultant materials under 'real' application conditions are novel.

Disclosed herein are catalysts, base metal promoters, and methods for using the same. In one embodiment, an oxidation catalyst can comprise a catalytic material disposed on a support. The catalyst will additionally comprise about 10 wt % to 50 wt % of a base metal modified Cubic Fluorite Ce—Zr mixed oxide component and about 10 wt % to about 50 wt % Zeolite based upon the total weight of the catalyst formulation.

In one embodiment, a catalytic device can comprise a housing disposed around a substrate with a compression ignition oxidation catalyst disposed on the substrate. Also, the method for treating a compression ignition exhaust stream can comprise: introducing a diesel exhaust stream to a compression ignition oxidation catalyst; and oxidising an exhaust stream component.

The catalyst materials, including the metal doped OS, can be included in the formulation by combining alumina, or other appropriate support, with other catalyst materials to form a mixture, drying (actively or passively), and optionally calcining. More specifically, a slurry can be formed by combining alumina, doped OS powder and water, and optionally pH control agents (such as inorganic or organic acids and bases) and/or other components. The catalytic materials (e.g. catalytic metals, such as Pt), can be added as salt(s) (e.g. inorganic salts and/or organic salts). This slurry can then be washcoated onto a suitable substrate. The washcoated product can be dried and heat treated to fix the washcoat onto the substrate.

The catalyst can further comprise a Zeolite. Possible Zeolites include Y-type Zeolite, beta Zeolite (β), ZSM-5, silica alumina phosphate (SAPO e.g. SAPO34) and the like, as well as combinations comprising at least one of the foregoing Zeolites. The Zeolite can, for example, have a silica to alumina ratio (Si:Al) of about 15 to about 80, or, more specifically, about 35 to about 60. If the Zeolite is employed, it can be added to the slurry along with the catalytic material (e.g., before the catalytic material has been calcined).

This slurry can be dried and heat treated, e.g., at temperatures of about 500° C. to about 1,000° C., or more specifically about 500° C. to about 700° C., to form the finished catalyst formulation. Alternatively, or in addition, the slurry can be washcoated onto the substrate and then heat treated as described above, to adjust the surface area and crystalline nature of the support. Once the support has been heat treated, catalyst metals may optionally be disposed on the support. The catalyst metals, therefore, can be added after the washcoat is fixed onto the substrate by additional washcoat steps and/or by exposing the washcoated substrate to a liquid containing the catalytic metal.

The supported catalyst can comprise a PGM (Pt, Pd, Rh etc.), (modified) alumina, and Zeolite, optionally silica to which the metal doped OS is added. The amounts of these components in the supported catalyst can be: about 0.1 wt % to about 10 wt % PGM, about 50 wt % to about 80 wt % (modified) alumina, about 10 wt % to about 50 wt % metal doped OS, and about 10 wt % to about 50 wt % Zeolite; or, more specifically, about 1 wt % to about 5 wt % PGM, about 40 wt % to about 60 wt % modified alumina, about 25 wt % to about 45 wt % of metal doped OS, and about 25 wt % to about 45 wt % Zeolite.

The supported catalyst can be disposed on a substrate. The substrate can comprise any material designed for use in the desired environment, e.g., a compression ignition engine (e.g., a diesel engine) environment. Some possible materials include cordierite, silicon carbide, metal, metal oxides (e.g., alumina, and the like), glasses, and the like, and mixtures comprising at least one of the foregoing materials. These materials can be in the form of packing material, extrudates, foils, perform, mat, fibrous material, monoliths (e.g., a honeycomb structure, and the like), other porous structures (e.g., porous glasses, sponges), foams, molecular sieves, and the like (depending upon the particular device), and combinations comprising at least one of the foregoing materials and forms, e.g., metallic foils, open pore alumina sponges, and porous ultra-low expansion glasses. Furthermore, these substrates can be coated with oxides and/or hexaaluminates, such as stainless steel foil coated with a hexaaluminate scale.

Although the substrate can have any size or geometry, the size and geometry are preferably chosen to optimise geometric area in the given exhaust emission control device design parameters. Typically, the substrate has a honeycomb geometry, with the combs through-channel having any multi-sided or rounded shape, with substantially square, triangular, pentagonal, hexagonal, heptagonal, or octagonal or similar geometries preferred due to ease of manufacturing and increased surface area.

Once the supported catalytic material is on the substrate, the substrate can be disposed in a housing to form the converter. The housing can have any design and comprise any material suitable for the application. Suitable materials for the housing can comprise metals, alloys, and the like, such as ferritic stainless steels (including stainless steels such as, e.g., the 400-Series such as SS-409, SS-439, and SS-441), and other alloys (e.g. those containing nickel, chromium, aluminium, yttrium and the like, e.g., to permit increased stability and/or corrosion resistance at operating temperatures or under oxidising or reducing atmospheres).

Also similar materials as the housing, end cone(s), end plate(s), exhaust manifold cover(s), and the like, can be concentrically fitted about the one or both ends and secured to the housing to provide a gas tight seal. These components can be formed separately (e.g., moulded or the like), or can be formed integrally with the housing methods such as, e.g., a spin forming, or the like. A suitable device is illustrated in Nunan, U.S. 2005/0129588 A1.

Disposed between the housing and the substrate can be a retention material. The retention material, which may be in the form of a mat, particulates, or the like, may be an intumescent material e.g., a material that comprises vermiculite component, i.e., a component that expands upon the application of heat, a non-intumescent material, or a combination thereof. These materials may comprise ceramic materials e.g., ceramic fibres and other materials such as organic and inorganic binders and the like, or combinations comprising at least one of the foregoing materials.

Thus, the coated monolith containing the metal doped OS augmented DOC is incorporated into the exhaust flow of the compression ignition engine. This provides a means for treating said compression ignition exhaust stream to reduce the concentrations of environmental toxins by passing said diesel exhaust stream after the aforementioned compression ignition oxidation catalyst under net oxidising conditions (oxygen rich) to facilitate catalytic conversion/oxidation into more environmentally benign products.

The above-described catalyst and process and other features will be appreciated and understood by those skilled in the art from the following detailed description, drawings, and appended claims

BRIEF DESCRIPTION OF THE DRAWINGS

The present invention may be further understood from the detailed description further below in connection with the drawings, a brief description of which is provided herebelow. The following key informs both the detailed discussion and the brief description of the drawings.

Key: All Compositions Quoted as Wt %

OS1=40% $CeO_2$; 50% $ZrO_2/HfO_2$; 5% $La_2O_3$; 5% $Pr_6O_{11}$
OS2=31.5% $CeO_2$; 58.5% $ZrO_2/HfO_2$; 5% $La_2O_3$; 5% $Y_2O_3$
OS3=44% $CeO_2$; 42% $ZrO2/HfO_2$; 9.5% $La_2O_3$; 4.5% $Pr_6O_{11}$

FIG. 1 illustrates a comparison of the $H_2$ Temperature Programmed Reduction (TPR) performance of a CeZrLaPrO$_{2-x}$ mixed oxide (OS3) before and after post-synthetic basic exchange of 2 wt % Cu.

FIG. 2 illustrates Synthetic Gas Bench (SGB) performance data for the oxidation of a simulated diesel stream.

FIG. 3 illustrates an impact of OS composition on catalytic performance in standard SGB testing, using the conditions described in FIG. 2, for 5% Cu doped OS1 and OS2.

FIG. 4 illustrates CO light-off temperatures for a range of ion exchanged OS materials in SGB testing, again using the conditions outlined in FIG. 2.

FIG. 5 illustrates comparative performances of 5 wt % Cu—OS3 vs Pt DOC @ 70 gcf over successive aging cycles.

FIG. 6 illustrates comparative performances of 5 wt % Cu—OS3 mixed with Pt DOC (total Pt @ 35 gcf) vs Pt DOC @ 70 gcf over successive aging cycles.

FIG. 7 illustrates comparative performances of 5 wt % Cu—OS3 mixed with Pt DOC (total Pt @ 35 gcf) vs Pt DOC @ 120 gcf over successive aging cycles.

FIG. 8 illustrates a comparison of SOx poisoning tolerance/resistance of various DOC core samples.

FIG. 9a illustrates comparative dynamometer aging and testing results for CO performances of DOC washcoats A, B, and C vs a 70 gcf Pt reference.

FIG. 9b illustrates comparative dynamometer aging and testing results for HC performances of DOC washcoats A, B, and C vs a 70 gcf Pt reference.

FIG. 10 illustrates dynamometer performance of the parts tested in FIGS. 9a/9b in vehicle testing.

FIG. 11 illustrates CO light-off curves after initial oven aging, sulfation and de-sulfation.

FIG. 12 illustrates comparative dynamometer aging and testing performances of: a 70 gcf Pt 6 inch part; a 2Cu—OS3 3 inch part followed by a 70 gcf Pt 3 inch part; a 70 gcf Pt 3 inch part followed by a 2Cu—OS3 3 inch part; and a 70 gcf Pt 3 inch part.

FIG. 13 illustrates comparative dynamometer aging and testing performances of: a 90 gcf 3:1 reference sample; vs a 90 gcf 3:1+OS3 sample; vs a 90 gcf 3:1 2Cu—OS3 sample.

FIG. 14 illustrates the further dynamometer aging and testing performances of selected parts from FIG. 9a, wherein the base metal only sample (Part C) was replaced with a commercial Pt:Pd DOC 60 gcf @ 2:1 (Part D).

FIG. 15 illustrates comparative results of the technologies from FIG. 14 in standard vehicle performance testing.

FIG. 16 illustrates comparative dynamometer aging and testing performances at lower total PGM contents.

FIG. 17 illustrates comparative dynamometer aging and testing performances of: a 30 gcf Pt:Pd @ 2:1 sample with a secondary layer of 2Cu—OS3 and Zeolite (Part F); vs a 30 gcf Pt:Pd @ 2:1 commercial sample (Part G); vs a 30 gcf Pt:Pd @ 2:1 sample with 2Cu—OS3 in the same layer as the PGM, alumina and Zeolite (Part H).

FIG. 18 illustrates comparison activity of a 70 gcf Pt only reference sample; vs a 70 gcf Pt+2% Cu—OS3 sample; vs a 120 gcf Pt:Pd @ 3:1 sample.

FIG. 19 illustrates a comparison of four samples, all of which contain 30 gcf Pt:Pd @ 2:1, including a commercial reference sample without 2Cu—OS3 and three samples containing a 50% second layer zone of the base metal promoter.

FIG. 20 illustrates the comparative dynamometer aging and testing performances of the parts introduced FIG. 19 with further SOx aging.

DETAILED DESCRIPTION OF THE INVENTION

FIG. 1 compares the $H_2$ Temperature Programmed Reduction performance of a CeZrLaPrO$_{2-x}$ mixed oxide (OS3) before and after post-synthetic basic exchange of 2 wt % Cu (hereafter all samples will be referred to a XMe—OS"Z" e.g.

2Cu—OS1). The incorporation of Copper (Cu) results in a dramatic promotion of the redox properties of the OS, with the exchanged material exhibiting high redox function at T<300° C. cf. the non-exchanged material which exhibits a redox maximum at ca. 575° C.

FIG. 2 reports Synthetic Gas Bench (SGB) performance data for the oxidation of a simulated diesel stream. Test conditions were selected to mimic a Euro V exhaust and comprised 1000 ppm CO, 600 ppm C1 n-Octane, 180 ppm C1 Methyl-Benzene, 75 ppm C1 Propene, 75 ppm C1 Methane, 80 ppm NO, 3.5% $CO_2$, 13% $O_2$, 3.5% $H_2O$, Balance $N_2$, Ramp 12° C./min and total flow 5 l/min. The testing was performed using 0.5 g Zeolite β (Silica Alumina Ratio 40) powder, positioned at the inlet of the reactor and 1.5 g base metal oxidation catalyst powder material (fresh) positioned at the outlet i.e. behind the Zeolite HC trap. The data confirms the efficacy of both the Cu and Ag doped OS1 for the catalytic oxidation of both CO and HC, with the former exhibiting an especial benefit with respect to CO oxidation.

FIG. 3 examines the impact of OS composition on catalytic performance in standard SGB testing, using the conditions described in FIG. 2, for 5% Cu doped OS1 and OS2. Again both samples demonstrate fresh activity for the oxidation of CO and HC, even in the absence of PGM. In this instance the oxidation of CO is favoured using 5%-OS1, consistent with the high Ce content of this material and consistent with the aforementioned concept of high redox activity coupling with the CO oxidation reaction.

FIG. 4 summarises the CO light-off temperatures for a range of ion exchanged OS materials in SGB testing, again using the conditions outlined in FIG. 2. Of the various samples tested all showed good activity, with the exception of 1Au—OS2 which displayed activity more consistent with a conventional i.e. non-promoted OS. The data also reflect that using the ion exchange method it is possible to introduce multiple dopants simultaneously and still achieve good activity. Hence the activity of 1Fe-1Ag-1Cu—OS1 and 1Ag-1Cu-1Co—OS3 are equivalent to the 5Cu—OS2 i.e. comparable performance at lower dopant content. This demonstrates both the flexibility of the approach but also opens the possibility of developing multi-functional oxides e.g. incorporation of Ag for the promotion of direct soot oxidation as per U.S. application Ser. Nos. 12/363,310 and 12/363,329 and the inclusion of Cu for the maximum promotion of Cu oxidation activity.

Given the promising performance displayed in initial testing a comparison was made between the activity of a 5Cu—OS3 sample and a commercial Pt-only DOC powder (70 grams per cubic foot Pt, hereafter 70 gcf Pt). Experimental conditions are described in FIG. 2, except the OS sample was based upon 0.7 g of Zeolite β (pre-bed) and 1.3 g of 5Cu—OS3 powder in order to obtain equal Zeolite load. In addition the samples were aged in-situ on the SGB and their activity examined at discrete aging intervals. Each aging step comprised exposure of the sample to the full reactive gas environment of FIG. 2 at increasing temperature intervals of 700, 750, 800, 850 and 900° C. for a period of 4 hours at each temperature. In all cases the bed temperature was monitored and found to be ca. 10-15° C. hotter than the furnace, this is ascribed to combustion of the fuel (CO and HC) in the reactive gas mixture. The comparison in FIG. 5 is telling. While the fresh performance of the Pt DOC is clearly better this is not the case after high temperature aging. Hence after 4 hours at 700° C., the Pt-DOC now only exhibits a small benefit, while after addition of a second aging cycle (4 h at 750° C.) the performance of the two materials is identical, as is the case after additional aging at 800° C. Indeed it should be noted that the performance of the doped OS shows no degradation from fresh after successive aging steps at 700 and 750° C. More severe aging steps at 850 and 900° C. do however result in a larger deactivation penalty for the 5Cu—OS3. This is ascribed to losses in surface area collapse under these harsh conditions. However the conditions herein likely exceed any hydrothermal extreme with respect to time at temperature that would be found in a vehicular application. Notwithstanding this observation what is to be stressed herein is that performance of a base metal catalyst is equivalent to a commercial Pt-based DOC, a result of some importance.

The benefits of the base metal doped OS for CO oxidation are further emphasised in FIG. 6 which compares the performance of the 70 gcf Pt to 1:1 mixture of the 70 gcf Pt powder and the 5Cu—OS3 sample, i.e. corresponding to an effective Pt load of 35 gcf. Aging and testing were performed as per FIG. 5. Again the 70 gcf reference exhibits a fresh benefit, albeit significantly decreased cf. base metal powder only. However after aging the converse is the case. Thus the CO $T_{50}$/CO oxidation activity of the mixed Pt-base metal sample is lower by 15-18° C. cf. the 70 gcf Pt sample, i.e. superior performance is realised while decreasing the PGM content by 50%. Moreover the mixed powder does not exhibit the same marked deactivation after 850 and 900° C., we ascribe this to a synergy between the Pt and base metal components which circumvents the surface area collapse of the doped OS which appears to be accelerated during the exothermic combustion of fuel species at high temperatures.

FIG. 7 further demonstrates the promise of the 5% Cu—OS3-35 gcf Pt sample on the SGB. Herein we compare the sample against at 120 gcf Pt DOC, again using the aging and testing protocols defined in FIG. 5. In this instance the high loaded Pt DOC exhibits superior performance under all conditions, but only at considerable expense in terms of PGM content. Analysis of FIGS. 5-7 suggests that based upon SGB screening and aging the performance benefit of the 5Cu—OS3 equates to ca. 60 gcf Pt content on a conventional DOC, a considerable potential saving.

Having established the hydrothermal durability benefits of the concept, the next step was to examine SOx poisoning tolerance/resistance. This was first examined on the SGB. In these tests coated monolith cores (0.75" by 1") were tested using a simulated exhaust mixture containing 1000 ppm CO, 375 ppm C1 $C_3H_6$, 300 ppm NO, 8% $CO_2$, 10% $H_2O$, 5% $O_2$ and $N_2$ balance with a Ramp 12° C./min and total flow 5 l/min. The light-off of each core was tested twice using this mixture and then a further two times using this mixture with the addition of 5 ppm $SO_2$ to affect SOx poisoning (5 ppm as $SO_2$ would correspond to 50 ppmw fuel sulphur). Three cores A, B and C were tested FIG. 8. Core A comprised a DOC with 60 gcf Pt/Pd (60 (2:1 i.e. 40 gcf Pt and 20 gcf Pd) to which a second layer comprising 2Cu—OS3+Zeolite β was added. Core B used an identical composition and architecture except the PGM content was 60 gcf at 1:5 i.e. 10 gcf Pt and 50 gcf Pd. Core C employed the same architecture and base metal oxide ratios except this sample contained 0 gcf PGM. Prior to testing all samples were 'stabilised' by aging 1 h at 650 C in the reactive gas mixture without $SO_2$. The data (FIG. 8) illustrates some very salient issues. Firstly the performance of the 2Cu—OS3 only is considerably weaker than in previous tests. This is ascribed to the speciation of HC employed in the protocol i.e. a high propene only content. In this instance the Zeolite does not interact with this HC moiety and hence preferential adsorption occurs on the active sites of the OS, thereby preventing CO access and resulting in the large inhibition of light-off. Additionally upon the introduction of $SO_2$ the activity of Core C is seen to undergo a stepwise, and catastrophic, deactivation. Again this reflects a specific sensitivity of the active Cu sites contained within the material. In contrast when the 2Cu—OS3 is employed with PGM present high activity is retained. Thus for Core A, performance is highly stable and reproducible with all CO $T_{50}$ values being within experimental error. The activity of Core B is marginally weaker and does show some systematic deactivation with rise number, particularly after the introduction of $SO_2$, this being ascribed to the higher $SO_2$ sensitivity of Pd vs Pt. However the activity is still comparatively high but suggests that in vehicular applications the combination of base metal promoter and PGM is likely to yield optimal results.

FIG. 9a and FIG. 9b illustrate the dynamometer (hereafter dyno) performance of full size parts (4" round by 6" long, 400 cells per square inch) of DOC washcoats A, B and C versus a 70 gcf Pt reference technology. All parts were tested after oven aging (700° C., 10% steam, air for 25 hours), after aging 20 hours on the dyno in an exhaust stream from a combustion cycle using a fuel source with 500 ppm S, and finally after a de-sulfation/further hydrothermal aging again on the dyno, exposing the sample for 5 hours to hot exhaust gases at a DOC inlet temperature of 650° C. (note. This aging is performed using standard ultra low S diesel fuel). The data reflect the findings from the SGB testing of FIG. 8. Again the 2Cu—OS3 without PGM displays poor activity, with no light-off for either CO or HC seen under any test or aging cycle examined. This confirms the strong inhibition of the base metal catalyst by the toxic HC and SOx species in the exhaust. Again in contrast the performance of parts A and B is significantly better. Under all conditions the CO oxidation activity of Part A outperforms the reference, and does so with markedly less PGM. The CO performance of Part B is also surprising and comes close to matching the reference despite the low Pt content and conventionally unfavourable Pt:Pd ratio. Of equal interest are the trends in HC activity for the PGM containing parts. For the 70 gcf Pt part, HC light-off closely matches the CO $T_{50}$, suggesting the light-off process for both is fundamentally linked due to a common site. In contrast there are marked differences between the CO $T_{50}$ and HC light-offs for Parts A and B. In both cases CO light-off occurs 10-25° C. lower temperature than HC light-off, this is ascribed to the benefit of the 2Cu—OS3 powder for CO oxidation, resulting in a performance boost that is not seen for HC oxidation due to the different sites required for this process.

FIG. 10 confirms the dyno performance of the parts tested in FIG. 9a/9b in vehicle testing (the data reports the activity after 700° C. aging oven cycle). Again the base metal only sample (Part C) displays poor activity for CO and HC. In contrast Part A (2Cu—OS3 with 60 Pt/Pd @ 2:1) shows a definite CO performance advantage, this being derived from superior ECE performance i.e. cold start/light-off benefit. Finally Part B (2Cu—OS3+60 Pt/Pd @ 1:5) shows a fair performance, again inconsistent with the PGM type and content.

A further, and highly interesting, observation from the screening of FIG. 9a/b, is the response of Part A after SOx aging and subsequent De-SOx/limited hydrothermal aging (5 h 650° C.). Hence FIG. 11 illustrates the CO light-off curves after initial oven aging, sulfation and de-sulfation. While the impact of sulphur is clear and unambiguous, it is also apparent that after hydrothermal aging almost full activity is recovered. This effect we ascribe to the facile de-sulfation of both the PGM centres and especially the 2Cu—OS3. This effect will be examined in more detail in later Figures.

Given the disappointing activity of the 2Cu—OS3 only sample, a further dyno aging and testing study was performed. Herein the performance of a 70 gcf Pt 6 inch long part is contrasted with a 70 gcf Pt 3 inch part, a 70 gcf Pt 3 inch part followed by a 2Cu—OS3 3 inch long part and a 2Cu—OS3 3 inch long part followed by a 70 gcf Pt 3 inch part. This would determine whether the synergy observed could also be realised using a 'zoned' or split brick method. The data in FIG. 12 confirms that such a synergy can still occur. Hence the performance of the 70 gcf Pt 3"/2Cu—OS3 3" shows clear advantages to either the 70 gcf Pt 3" or 2Cu—OS3 3"/70 gcf Pt 3" thereby confirming that the conventional DOC zone affords 'protection' of the active base metal catalyst sites to the toxic components in the exhaust stream, thereby facilitating the second (base metal only) brick to provide additional CO oxidation function. The same is not true for the reverse configuration with the activity of the 2Cu—OS3 3"/70 gcf Pt 3" and 70 gcf Pt 3" systems being within experimental variation.

To further demonstrate/differentiate the benefits a direct comparison of the performance benefits of 2Cu—OS3 versus OS3 without modification was undertaken. The results are depicted in FIG. 13. Herein one can see that the performance of a conventional DOC 90 gcf Pt:Pd 3:1 and a DOC 90 gcf Pt:Pd 3:1+OS3 are equivalent after aging, under both standard light-off protocols. In contrast, the 90 gcf Pt:Pd 3:1+ 2Cu—OS3 sample offers a CO $T_{50}$ benefit of ca 7-10 C depending upon light-off protocol. Since all parts were selected based upon near identical metal loading, and the aging cycles for all parts were equivalent one can unambiguously attribute the benefit to a promoting effect provided only by the base metal modified OS, and not by a standard OS material.

To re-confirm the beneficial role of the 2Cu—OS3, further dyno aging and testing were performed using selected parts from FIG. 9a, wherein the base metal only sample (Part C) was replaced with a commercial PtPd 60 @ 2:1 DOC (labelled Part D) i.e. equivalent to Part A with respect to PGM. FIG. 14 reports the performance in subsequent hydrothermal and post injection/filter regeneration aging cycles. Herein the benefit of the base metal component is clearly evident, with Part A offering a light-off benefit of 8-25° C., depending upon the specific aging and type of simulated exhaust (Euro 4 or 5). Of further interest is a comparison of Part B and the 70 gcf Pt reference, previously the reference had shown superior activity, but with increasing severity of aging the high Pd content technology with the base metal now begins to outperform the reference, the benefit being particularly evident for the more demanding Euro 5 light-off conditions.

FIG. 15 compares the technologies from FIG. 14 in standard vehicle performance testing. Herein the benefit of the Part A (60 gcf @ 2:1 with 2Cu—OS3 base metal) vs the 60 gcf (2:1 without base metal is confirmed (testing performed after oven aging). Once again the enhanced activity is attributed to superior conversion efficiency during the ECE i.e. enhanced light-off activity.

Further testing of the concept was performed at lower total PGM contents to determine the extent of any performance promotion under critical conditions. From FIG. 16 it may be seen that the use of the base metal component provides for even more dramatic reductions in total PGM content and type. Hence all three 2Cu—OS3 containing parts, Part A (60 @ 2:1), Part E (21 (2:1) and Part F (30 @ 2:1) offer reasonably competitive performance versus the 70 gcf Pt reference. Indeed in addition to the previously demonstrated high performance of Part A, the data now confirm that Part F provides comparable performance to the reference at a further PGM reduction of 50% from Part A. This enhanced performance again likely exceeds any benefit attributable to the PtPd function only, as is reflected in the significant deactivation effect due to SOx poisoning and subsequent recovery after further hydrothermal aging.

FIG. 17 compares the dyno aging and testing performance of Part F (30 (2:1 with a secondary layer of 2Cu—OS3 and Zeolite) versus a commercial reference technology Part G (also 30 @ 2:1) versus Part H (30 @ 2:1 with 2Cu—OS3 in the same layer as the PGM, alumina and Zeolite, but at 50% content cf. Part F). Again the reference is outperformed by the 2Cu—OS3-containing parts after oven aging with Part F displaying the best performance, consistent with the higher loading of promoter. After SOx aging all parts are equal, consistent with poisoning of the base metal function i.e. the only activity is now derived from the PtPd function and hence all parts are equal, as they should be given their equal PGM loading and type. After further hydrothermal aging, and associated De-SOx, the 2Cu—OS3 parts recover a significant performance advantage, and again the ranking is seen to follow the loading of base metal promoter. Finally after the filter regeneration aging cycles only Part F is seen to maintain a competitive advantage versus the reference. Indeed, it appears the combination of post injection aging with a mixed PGM/base metal single layer is undesirable and results in a significant performance loss. Thus it may be concluded that while the base metal promoter may be employed in the same layer as the PGM, such a configuration is not suited to applications wherein the DOC must facilitate DPF regeneration. However it is equally clear that if DPF regeneration is required the use of the layered PGM/base metal catalyst design is not only appropriate it does in fact again offer a significant performance advantage versus a conventional DOC design.

As has been repeatedly noted, an especially interesting feature of the performance of the base metal modified DOCs is their response to SOx. This process has been studied in more detail giving the data in FIG. 18. Herein the activity of a 70 gcf Pt only reference is compared with a 70 gcf Pt+2% Cu—OS3 (in a second layer) and also with a 120 gcf PtPd @ 3:1 (again with the modified OS in a second layer). Both samples exhibit activity benefits after 20 h dyno aging at 650° C. (5-12° C. for CO $T_{50}$), as per previous data. Also consistent with all previous results this benefit is lost after SOx aging. In fact in this instance both base metal containing samples exhibited weaker performance than the reference after 20 h SOx aging. It should also be noted that the SOx aging penalty for the Pt only reference is also a fraction of that for parts J and K, this higher poisoning tolerance is attributed solely to the absence of the 2Cu—OS3 modifier. However, after exposure of the parts to a short exotherm, in this case 15 minutes at 650° C. inlet (to simulate a DPF regeneration cycle), the previous level of high activity of both samples are restored. Since this regeneration occurs for both PtPd and Pt only samples, the effect cannot be ascribed to the typical regeneration seen for PtPd after DeSOx cycles but must instead be due to De-SOx of the 2Cu—OS3. A second 15 min 650 C cycle was then performed but all samples exhibited performance within experimental variation to the previous test and the test performed prior to SOx exposure. These observations indicate that de-sulfation of the base metal component is both rapid and facile and would be incorporated within the normal driving cycle of the vehicle. i.e. SOx exposure would slowly poison the CO oxidation function of the base metal component, but the sample would never see full deactivation as the periodic regeneration of the DPF would be sufficient to completely regenerate/De-sulfate the Cu—OS3.

FIG. 19 and FIG. 20 further illustrate the SOx and De-SOx characteristics of the 2Cu—OS3 material. In this instance the impact of zone coating, and more specifically the direction of zone coating on the CO oxidation performance vs SOx are examined. Hence in FIG. 19 we compare 4 parts, all of which contain 30 gcf PtPd @ 2:1 Pt:Pd, one is a commercial reference without 2Cu—OS3 while the other three all contain a 50% second layer zone of the base metal promoter. Firstly there is Part L in its 'correct' orientation i.e. zone of base metal/Zeolite at the inlet, next is Part L in a 'reverse' orientation i.e. zone of base metal/Zeolite at the outlet, while Part M contains the base metal promoter only in an inlet zone i.e. in the 'correct' orientation. All parts were aged 20 h 650° C. and then exposed to a 2 h SOx aging and the CO 'light-off' performance is two consecutive 'ramp' tests (i.e. sample is heated under reactive gas flow from ca. 150 to ca. 350° C., this is achieved at a ramp rate of 20° C./min using a standard heat exchanger assembly). The data show two interesting trends. Firstly, the base metal modified DOCs do not exhibit the same extent of deactivation as observed in previous SOx aging cycles e.g. FIG. 18. Indeed all three test parts still offer significant $T_{50}$ benefits, suggesting that the use of the base metal in a zone may be advantageous for SOx based aging cycles. Secondly, a marked improvement in CO $T_{50}$ from rise 1 to rise 2 is seen for both Part L technologies. Indeed, comparison with subsequent $T_{50}$ values after a further 1 h aging at 650° C. show identical performance (within experimental variation). Thus it appears that for Part L, in both flow directions, that a temperature as low as 350° C. may be sufficient to remove the majority of SOx accumulated and recover the full activity of the 2Cu—OS3. Additionally, the data suggest that the 'reverse' direction of canning, may offer a further performance benefit, particularly versus SOx exposure. In contrast the impact of repeated rises is seen to be far less for the reference and Part M, with most of the $T_{50}$ values being within experimental variation.

More extensive SOx aging of the parts introduced FIG. 19 was then executed, giving the results as shown in FIG. 20. Herein the samples were aged for a further 20 h in SOx before again being tested in a repeated rise test. In this instance reactivation was found to be far less pronounced, with only 'Part L reversed' exhibiting statistically significant recovery after the first rise. Again however all three 2Cu—OS3—containing parts did not show the previous weaknesses with respect to SOx aging, with all parts being equal or better compared to the reference, confirming the suitability of the zone approach for such aging cycles. Moreover after aging using 100 DPF regeneration cycles one can again clearly see the superior hydrothermal durability provided to the DOC by the inclusion of the base metal promoter, with $T_{50}$ benefits of 6-16° C. being evident with again the Part L, in reverse configuration, offering the best performance.

The present invention relates to the development and use of base metal promoters for emission treatment catalysts. The base metal promoter is derived from a substantially phase pure cubic fluorite (as determined by XRD) of the CeZrO$_x$ type which is well known in the art. This parent material is subsequently modified by the introduction of base metal e.g. transition or other metal as defined in U.S. application Ser. Nos. 12/363,310 and 12/363,329. This modification is proposed to arise, whilst not wishing to be bound by theory, from an ion exchange of the Ce$^{3+}$—OH hydroxyls, present in both the surface and to a lessor extent in the bulk of the crystal, by the base metal element/ion selected for this purpose and results in a significant promotion of the redox/oxygen ion conductivity of the CeZrO$_x$.

The base metal promoted CeZrOx materials/base metal promoter may be applied advantageously to an emission control catalyst for a diesel (or other fuel lean) application. The particular example described herein is for the application of these materials in the area of catalytic oxidation of (especially) CO and HC. This new generation of modified OS materials has been demonstrated as having particular benefit in affecting the low temperature oxidation of CO and HC as compared to non-modified OS materials.

It should be further noted that the terms "first", "second" and the like herein do not denote any order of importance, but rather are used to distinguish one element from another, and the terms "a" and "an" herein do not denote a limitation of quantity, but rather denote the presence of at least one of the referenced items. Furthermore, all ranges disclosed herein are inclusive and combinable (e.g., ranges of "up to about 25 weight percent (wt. %), with about 5 wt. % to about 20 wt. % desired, and about 10 wt. % to about 15 wt. % more desired" is inclusive of the endpoints and all intermediate values of the ranges, e.g. "about 5 wt. % to about 25 wt. %, about 5 wt. % to about 15 wt. %" etc.

The method for producing the metal promoter is referred to as the basic exchange for enhanced redox process. This process describes a method for the modification of conventional cerium-zirconium-based mixed oxides, also known as, oxygen storage materials (OSM). The process involves the treatment of the OSM with a basic, where possible an ammoniacal solution of the dopant metal. Base metals i.e. common metals, currently being employed in this process include, but are not limited to, transition metals, e.g. silver, copper and cobalt; alkali metals e.g. potassium; alkaline earth metals e.g. calcium, strontium, barium. In those instances where the base metal required for exchange does not form air stable ammoniacal complexes e.g. aluminium and iron, stable basic complexes of organic amines may be employed. The term "transition metal" as used herein means the 38 elements in groups 3 through 12 of the Periodic Table of the Elements.

The variables in the process include (1) the OSM/mixed oxide selected, (2) the base metal used, and (3) the concentration of that metal. Metal concentrations successfully employed have ranged from 0.02 to 5.0 wt %. However, at higher metal exchange levels bulk metal oxides may be formed which do not retain the synergistic coupling with the OSM. Hence, the most preferred range for ion exchange is 0.1 to 2.5 wt %.

The base metals are typically received as a metal salt or solution of salt e.g. nitrate. As indicated, most base metals form a water-soluble complex with ammonium hydroxide. In those instances wherein the ammoniacal complex is unstable an organic amine e.g. tri-ethanolamine may be employed instead. In the process, the solution of an acidic metal solution is converted to a chemically basic form by addition of the ammoniacal base. The chemistry and amounts of base used vary with the metal used. The resulting solution is then used to impregnate the mixed oxide powder, thereby ion-exchanging the surface and sub-surface Ce—OH hydroxyls (surface terminations and bulk defects which act as acidic centres under the conditions of synthesis). It is this exchange process which is believed to be responsible for the improvements in the redox behaviour of the thus modified mixed oxide. The impregnated mixed oxide must first be calcined at sufficient temperature to drive off the inorganic anions (e.g. nitrate and ammonium ions), typically >350° C. After calcination the metal that was added is now bound to the former Ce—OH centres.

The mixed oxide/OSM material of this invention comprises any known or predicted Cerium-containing or Ce—Zr-based stable solid solution. Preferably, the solid solution contains a cationic lattice with a single-phase, as determined by standard X-ray Diffraction method. More preferably this single-phase is a cubic structure, with a cubic fluorite structure being most preferred. Additionally it is noted that the ion exchange process may be performed without formation of additional bulk phases, as determined by XRD, providing the concentration of exchanged cation does not exceed the Ce—OH 'concentration' of the cubic fluorite lattice. In various embodiments, the OS material may include those OS materials disclosed in U.S. Pat. Nos. 6,585,944 6,468,941 6,387,338 and 6,605,264 which are herein incorporated by reference in their entirety. However, the flexibility of the basic exchange provides for the modification of all current known Cerium oxide and Ce—Zr-based solid solution materials to be thusly modified and enhanced.

The OS materials modified by the basic exchange method comprise a composition having a balance of sufficient amount of zirconium to decrease the reduction energies of $Ce^{4+}$ and the activation energy for mobility of 'O' within the lattice and a sufficient amount of cerium to provide the desired oxygen storage capacity. In another embodiment the OS shall contain a sufficient amount of stabiliser e.g. yttrium, rare earth (La/Pr etc.) or combination thereof to stabilise the solid solution in the preferred cubic crystalline phase.

The OS materials modified by the basic exchange method shall preferably be characterised by a substantially cubic fluorite structure, as determined by conventional XRD methods. The percentage of the OS material having the cubic structure, both prior and post exchange, is preferably greater than about 95%, with greater than about 99% typical, and essentially 100% cubic structure generally obtained (i.e. an immeasurable amount of tetragonal phase based upon current measurement technology). The exchanged OS material is further characterised in that it possess large improvements in durable redox activity with respect to facile oxygen storage and increased release capacity as described in detail in U.S. application Ser. Nos. 12/363,310 and 12/363,329.

Incorporation of these base metal modified CeZrOx materials has been found to provide significant activity benefits for the catalytic oxidation of (especially) CO and HC under fuel lean conditions. Hence their incorporation into the conventional Diesel Oxidation Catalyst (DOC) has been found to result in a surprising, and novel, enhancement of catalyst performance under 'real' life conditions.

It has been found that the base metal material may be advantageously applied either solely, or more preferably with a conventional PGM containing catalyst. The base metal material can thusly be applied in a variety of configurations e.g. in a single 'pass' i.e. as an intimate mixture with the PGM-containing formulation, as a separate layer coated prior to or more preferably subsequent to the conventional PGM formulation. Additionally the base metal material may be applied as a homogeneous coating, or as a partial or zone-coating covering a fraction of the entire monolith length. Finally the base metal material may be employed in a separate, second monolith brick situated downstream of the conventional PGM containing DOC. In all of these configurations appreciable performance benefits are realised and improvements in the hydrothermal durability of the subsequent emission control catalyst are also observed.

EXAMPLES

The procedure for making Parts A and B, employed as test technologies is as follows: Slurry Alumina at pH ca. 4.5 and mill to $d_{50}$ (diameter of 50% of the particles) of 4-6 microns, confirm $d_{90}$. Next take the required concentration of Pt nitrate solution and slowly dilute with rheology modifier as required prior to adding solution dropwise to milled Alumina slurry.

Slurry must be at a pH lower than 6.0 prior to metal addition and during Pt addition, monitor pH and prevent slurry from going to pH values below 3.0 with the judicious use of base. After metal addition, adjust to 3.5 with base and stir slurry for 2 hours. Next add the required concentration of Pd Nitrate solution dropwise, again during metal addition, monitor pH and prevent slurry from going to pH values below 3.0 with the judicious use of base. Stir resultant mixture for one hour to allow full chemisorption of metal. Then coat monolith in 1 pass and calcine at temperatures ≥540° C. for ≥1 hour. Next take previously prepared 2Cu—OS3 (see U.S. application Ser. No. 12/363,310579A for details) powder and slurry with minimal additional DI water required to maintain slurry viscosity/gravity, mill to $d_{50}$ of 4-6 microns, and confirm $d_{90}$. Add required solids of Zeolite β powder (correct for loss on ignition), again with minimal D.I. water. Lightly mill the mixture to homogenise. Re-confirm $d_{50}$ and $d_{90}$. Check specific gravity and pH and adjust to facilitate coating in one pass. Then coat monolith in 1 pass and calcine at temperatures ≥540° C. for ≥1 hour.

The procedure for making Part C, as employed as a test technology is as follows: Slurry Alumina at pH ca. 4.5 and mill to $d_{50}$ (diameter of 50% of the particles) of 4-6 microns, confirm $d_{90}$. Then coat monolith in 1 pass and calcine at temperatures ≥540° C. for ≥1 hour. Next take previously prepared 2Cu—OS3 (see U.S. application Ser. No. 12/363, 310 for details) powder and slurry with minimal additional DI water required to maintain slurry viscosity/gravity, mill to $d_{50}$ of 4-6 microns, and confirm $d_{90}$. Add required solids of Zeolite β powder (correct for loss on ignition), again with minimal D.I. water. Lightly mill the mixture to homogenise. Re-confirm $d_{50}$ and $d_{90}$. Check specific gravity and pH and adjust to facilitate coating in one pass. Then coat monolith in 1 pass and calcine at temperatures ≥540 C for ≥1 hour.

The procedure for making Part H, as employed as a test technology is as follows: Slowly add Alumina with milling to a $d_{50}$ of 7 microns (+1), $d_{90}$=20-25 and 100% pass <60 microns. Mix with Pt Nitrate with any required rheology modifiers for a minimum of 30 minutes then add dropwise to alumina slurry. Slurry must be at a pH lower than 6.0 prior to metal addition and during metal addition, monitor slurry pH and prevent it from going to pH values below 3.0 with the judicious use of base. Stir the resulting slurry for two hours and re-confirm $d_{10}$, $d_{50}$ and $d_{90}$. Next add Pd Nitrate solution dropwise and during metal addition, monitor slurry pH and prevent it from going to pH values below 3.0 with the judicious use of base. Stir resulting slurry for one hour to allow chemisorption, then re-confirm $d_{10}$, $d_{50}$ and $d_{90}$. Next slurry 2Cu—OS3 powder with minimal DI water required to maintain slurry viscosity/gravity and mill to $d_{50}$=4-6, confirm $d_{90}$. Add Zeolite β powder (correct for loss on ignition) and mix for a further 15 minutes. Add mixture to the alumina-PGM slurry, directly into mixing vortex whilst monitoring pH. During addition pH must be kept between 3-4. If the pH deviates adjust with acid or base as required while keeping the specific gravity of the slurry and solid content as high as possible. Re-confirm the $d_{10}$, $d_{50}$ and $d_{90}$. Finally adjust pH to 3.0-3.5 and specific gravity to allow 1 pass coating, then coat monolith in 1 pass and calcine at temperatures ≥540 C for ≥1 hour.

The procedure for making Part L, the zone coated DOC as employed as a test technology is as follows: Slowly add Alumina with milling to a $d_{50}$ of 7 microns (+1), $d_{90}$=20-25 and 100% pass <60 microns. Mix with Pt Nitrate with any required rheology modifiers for a minimum of 30 minutes then add dropwise to alumina slurry. Slurry must be at a pH lower than 6.0 prior to metal addition and during metal addition, monitor slurry pH and prevent it from going to pH values below 3.0 with the judicious use of base. Stir the resulting slurry for two hours and re-confirm $d_{10}$, $d_{50}$ and $d_{90}$. Next add Pd Nitrate solution dropwise and during metal addition, monitor slurry pH and prevent it from going to pH values below 3.0 with the judicious use of base. Stir resulting slurry for one hour to allow chemisorption, then re-confirm $d_{10}$, $d_{50}$ and $d_{90}$. Next add Zeolite β powder (correct mass required for loss on ignition) to slurry vortex, whilst monitoring pH which must be between 3-4, adjust with base if required. Keep specific gravity and solids as high as possible. Re-confirm $d_{10}$, $d_{50}$ and $d_{90}$, adjust pH (to 3.0-3.5) and specific gravity for 1 pass coating; coat and calcine at temperatures ≥540 C for ≥1 hour. Next slurry 2Cu—OS3 powder with minimal additional DI water required to maintain slurry viscosity/gravity, and mill to $d_{50}$ of 4-6 microns, confirm $d_{90}$. Next add Zeolite β powder (correct mass required for loss on ignition) to slurry vortex with minimal D.I. water to maintain slurry characteristics. Use a light mill pass to homogenise the slurry and re-confirm $d_{10}$, $d_{50}$ and $d_{90}$. Finally adjust pH to 3.0-3.5 and specific gravity to allow 1 pass coating then coat monolith in 1 pass and calcine at temperatures ≥540 C for ≥1 hour. Use piston coater to facilitate coating along only 50% of the length of the monolith.

While the invention has been described above with reference to exemplary embodiments, it will be understood by those skilled in the art that various changes may be made and equivalents may be substituted for elements thereof without departing from the scope and the general principle of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An oxidation catalyst, comprising:
   a primary catalytic component comprising a metal selected from the group consisting of platinum, palladium, iridium, rhodium, ruthenium, alloys thereof, and combinations thereof, disposed on a first support,
   a secondary catalytic component comprising a solid solution having a cubic fluorite structure, said solid solution comprises a post-synthetic base metal ion-exchanged cerium oxide having a greater concentration of a base metal at its surface than incorporated within its cubic fluorite structure.

2. The oxidation catalyst of claim 1, wherein the solid solution further comprises zirconium oxide.

3. The oxidation catalyst of claim 1, wherein the solid solution is a substantially phase pure solid solution (as determined by conventional X-ray Diffraction method) with oxygen ion conducting properties and comprises
   a. up to about 95 wt % zirconium
   b. up to about 95 wt % cerium
   c. up to about 20 wt % of a stabiliser selected from the group consisting of rare earth metals, yttrium, and mixtures thereof.

4. The oxidation catalyst of claim 1, wherein the solid solution is further doped with one or more dopant base metal species selected from the group consisting of a transition metal, an alkali metal, an alkaline earth metal, and group Mb metal.

5. The oxidation catalyst of claim 4, wherein the concentration of base metal species is about 0.01 wt % to about 10 wt %-of the cerium oxide phase.

6. The oxidation catalyst of claim 1, wherein the concentration of base metal species is 0.1 wt % to about 2.5 wt % of the cerium oxide phase.

7. The oxidation catalyst of claim 1, wherein the secondary catalytic component is applied in the same layer/pass as the primary catalytic component.

8. The oxidation catalyst of claim 1, wherein the secondary catalytic component is applied in a subsequent layer/pass to the primary catalytic component.

9. The oxidation catalyst of claim 1, wherein the secondary catalytic component is applied in a layer/pass prior to the primary catalytic component.

10. The oxidation catalyst of claim 1, wherein the base metal modified Cerium containing oxide is applied in a zone, wherein the zone is positioned at the outlet of the oxidation catalyst.

11. The oxidation catalyst of claim 1, wherein the secondary catalytic component is applied in a zone, wherein the zone is positioned at the inlet of the oxidation catalyst.

12. The oxidation catalyst of claim 1, wherein the secondary catalytic component is employed in a separate second monolithic brick situated downstream of the oxidation catalyst.

13. The oxidation catalyst of claim 1, wherein the secondary catalytic component undergoes facile and complete regeneration of CO oxidation function, which may have been poisoned due to accumulation of SOx-derived poisons, during the typical high temperature thermal excursions associated with operation of the vehicle are in highway driving or DPF regeneration cycles.

14. The oxidation catalyst of claim 1, wherein the base metal was provided as an ammoniacal complex.

15. The oxidation catalyst of claim 1, wherein the base metal was provided as an organic amine complex.

16. The oxidation catalyst of claim 1, wherein the base metal was provided as a hydroxide compound.

17. The oxidation catalyst of claim 1, wherein the base metal has a high level of dispersion such that phase analysis by conventional X-Ray diffraction methods shows that the secondary catalytic component exhibits a cubic fluorite structure of greater than 95%, a bulk metal oxide dopant phase of less than 5%, and a dopant metal oxide particle size, as determined by line-broadening/Scherrer equation method, of about 30 Å to about 100 Å.

18. The oxidation catalyst of claim 1, wherein the base metal has a high level of dispersion such that phase analysis by XRD shows that the secondary catalytic component maintains a cubic fluorite structure of at least 95% after hydrothermal oxidising aging at 1000° C.

19. The oxidation catalyst of claim 1, wherein the secondary catalytic component displays significant promotion of Oxygen Ion Conductivity at low temperature, as determined by conventional Temperature Programmed Reduction (TPR) methods, as compared to non-promoted OS materials.

20. The oxidation catalyst of claim 1, wherein the secondary catalytic component, as determined by TPR, displays high hydrothermal durability at temperatures appropriate for its application as a Diesel Oxidation Catalyst (DOC) at temperatures up to 1000° C. in the presence of steam, as compared to non-promoted OS materials.

21. A catalytic device, comprising:
a housing disposed around a substrate;
a compression ignition oxidation catalyst disposed on the substrate, the compression ignition oxidation catalyst comprising a primary catalytic metal selected from the group consisting of platinum, palladium, iridium, rhodium, ruthenium, alloys thereof, and mixtures thereof, and a secondary catalytic component comprising a solid solution having a cubic fluorite structure, said solid solution comprises cerium oxide and its surface having been ion-exchanged with a base metal.

22. The catalytic device of the claim 17, further comprising a retention material disposed between the housing and the substrate.

23. The oxidation catalyst of claim 1, wherein the secondary catalytic component further comprises a zeolite.

* * * * *